US012113653B2

United States Patent
Damnjanovic et al.

(10) Patent No.: US 12,113,653 B2
(45) Date of Patent: Oct. 8, 2024

(54) OPPORTUNISTIC FREQUENCY SWITCHING FOR FRAME BASED EQUIPMENT

(71) Applicant: QUALCOMM Incorporated, San Diego, CA (US)

(72) Inventors: Aleksandar Damnjanovic, Del Mar, CA (US); Srinivas Yerramalli, San Diego, CA (US); Xiaoxia Zhang, San Diego, CA (US); Tamer Kadous, San Diego, CA (US); Yongbin Wei, La Jolla, CA (US); Jing Sun, San Diego, CA (US); Andrei Dragos Radulescu, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/467,478

(22) Filed: Sep. 14, 2023

(65) Prior Publication Data

US 2024/0007335 A1 Jan. 4, 2024

Related U.S. Application Data

(62) Division of application No. 17/453,458, filed on Nov. 3, 2021, now Pat. No. 11,799,703, which is a division
(Continued)

(51) Int. Cl.
*H04B 1/7136* (2011.01)
*H04B 1/7143* (2011.01)
(Continued)

(52) U.S. Cl.
CPC ....... *H04L 27/2602* (2013.01); *H04B 1/7136* (2013.01); *H04B 1/7143* (2013.01);
(Continued)

(58) Field of Classification Search
CPC .. H04B 1/7136; H04B 1/7143; H04B 1/7156; H04L 27/2602; H04L 27/2646
See application file for complete search history.

(56) References Cited

U.S. PATENT DOCUMENTS 8,363,561 B2   1/2013   Hayashino et al.
8,861,661 B2 * 10/2014   Fujimura ........... H04B 7/15542
                                             375/349
(Continued)

FOREIGN PATENT DOCUMENTS

CN      106664280 A      5/2017
WO      WO-2017078035 A1 5/2017
(Continued)

OTHER PUBLICATIONS

International Search Report and Written Opinion—PCT/US2019/027921—ISA/EPO—Oct. 11, 2019 (182859WO).
(Continued)

*Primary Examiner* — Alpus Hsu
(74) *Attorney, Agent, or Firm* — Norton Rose Fulbright US LLP

(57) ABSTRACT

Techniques providing opportunistic frequency switching for frame based equipment (FBE), such as may be configured to minimize opportunistic frequency switching delay in FBE new radio (NR) unlicensed (NR-U) networks and/or to provide frequency diversity FBE access based on offset sequences of medium sensing occasions for the carrier frequencies are disclosed. Within the FBE mode network, a base station may configure a pattern of sensing locations in each frame for each frequency transmission unit of the plurality of frequency transmission units, wherein an inter-unit delay of sensing locations between a first frequency transmission unit and a next adjacent frequency transmission unit and between a last frequency transmission unit and the first frequency transmission unit is a fixed duration. Oppor-
(Continued)

tunistic frequency switching of embodiments may utilize the medium sensing locations for opportunistically switching between a sequence of the frequency transmission units for implementing frequency diversity FBE access.

28 Claims, 16 Drawing Sheets

Related U.S. Application Data of application No. 16/385,943, filed on Apr. 16, 2019, now Pat. No. 11,190,234.

(60) Provisional application No. 62/664,638, filed on Apr. 30, 2018, provisional application No. 62/663,862, filed on Apr. 27, 2018.

(51) Int. Cl.
    *H04B 1/7156*      (2011.01)
    *H04L 27/26*      (2006.01)

(52) U.S. Cl.
    CPC ....... *H04B 1/7156* (2013.01); *H04L 27/2646* (2013.01); *H04B 2001/71365* (2013.01); *H04B 2001/71563* (2013.01)

(56) References Cited

U.S. PATENT DOCUMENTS

| | | |
|---|---|---|
| 10,037,094 B2 | 7/2018 | Huang et al. |
| 10,103,929 B2 | 10/2018 | Opitz |
| 10,277,443 B2 | 4/2019 | Chang et al. |
| 10,299,272 B2 | 5/2019 | Yang et al. |
| 11,190,234 B2 | 11/2021 | Damnjanovic et al. |
| 2008/0069041 A1 | 3/2008 | Tandai et al. |
| 2017/0041042 A1 | 2/2017 | Wei |
| 2017/0085326 A1* | 3/2017 | Li ................. H04L 27/2666 |
| 2017/0202011 A1 | 7/2017 | Trainin et al. |
| 2018/0020360 A1 | 1/2018 | Yerramalli et al. |
| 2018/0115906 A1 | 4/2018 | Damnjanovic et al. |
| 2018/0267154 A1 | 9/2018 | Ootaka et al. |
| 2018/0324620 A1* | 11/2018 | Harada ............... H04W 16/14 |
| 2018/0324856 A1 | 11/2018 | Zhang et al. |
| 2019/0320452 A1 | 10/2019 | Zhang et al. |
| 2019/0334577 A1 | 10/2019 | Damnjanovic et al. |
| 2022/0060216 A1 | 2/2022 | Damnjanovic et al. |

FOREIGN PATENT DOCUMENTS

| | | |
|---|---|---|
| WO | WO-2017099860 A1 | 6/2017 |
| WO | WO-2017148944 A1 | 9/2017 |
| WO | WO-2017223196 A1 | 12/2017 |

OTHER PUBLICATIONS

International Preliminary Report on Patentability—PCT/US2019/027921, The International Bureau of WIPO—Geneva, Switzerland, Nov. 5, 2020 (182859WO).
Partial International Search Report—PCT/US2019/027921—ISA/EPO—Aug. 19, 2019 (182859WO).

\* cited by examiner

OPPORTUNISTIC FREQUENCY SWITCHING FOR FRAME BASED EQUIPMENT

CROSS-REFERENCE TO RELATED APPLICATIONS

This application is a divisional that claims the benefit of U.S. patent application Ser. No. 17/453,458, entitled, "OPPORTUNISTIC FREQUENCY SWITCHING FOR FRAME BASED EQUIPMENT," filed Nov. 3, 2021, and the benefit of U.S. patent application Ser. No. 16/385,943, entitled, "OPPORTUNISTIC FREQUENCY SWITCHING FOR FRAME BASED EQUIPMENT," filed Apr. 16, 2019, and the benefit of U.S. Provisional Patent Application No. 62/663,862, entitled "FREQUENCY DIVERSITY IMPLEMENTING OPPORTUNISTIC FREQUENCY SWITCHING FOR FRAME BASED EQUIPMENT ACCESS," filed Apr. 27, 2018, and 62/664,638, entitled "MINIMIZING DELAY WITH OPPORTUNISTIC FREQUENCY SWITCHING IN FBE NR-SS," filed Apr. 30, 2018, the disclosures of each of which are hereby incorporated by reference herein in their entirety as if fully set forth below and for all applicable purposes.

BACKGROUND

Field

Aspects of the present disclosure relate generally to wireless communication systems, and more particularly, to providing opportunistic frequency switching for frame based equipment (FBE), such as may be configured to minimize opportunistic frequency switching delay in FBE new radio (NR) unlicensed (NR-U) networks and/or to provide frequency diversity FBE access based on offset sequences of medium sensing occasions for the carrier frequencies.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Substantial interference and even the inability to access the medium on a given frequency may be experienced in some situations, particularly in areas of high demand. For example, communications utilizing contention-based shared spectrum (e.g., unlicensed spectrum) may experience cell edge performance issues, such as where receiver nodes can be subject to "hidden node" interference (i.e., interference from a first node that is visible to a second node, such as a wireless access point, but not to one or more receiver nodes communicating with the second node). Various procedures have been implemented to contend for access to such contention-based shared spectrum. For example, relatively complex schemes, such as the request to send/clear to send (RTS/CTS) procedure utilized in IEEE802.11-2016 standards, have been defined in an effort to reduce the occurrence of hidden node interference in unlicensed spectrum. Such solutions, however, have been technology specific and, depending on the deployment scenario, may be very suboptimal. Moreover, issues such as the inability to access the medium on a given frequency due to congestion are problematic with respect to such procedures. Accordingly, research and development continue to advance wireless technologies not only to meet the growing demand for mobile broadband access, but to advance and enhance the user experience with mobile communications.

SUMMARY

In one aspect of the disclosure, a method of wireless communication may include obtaining, by a receiver device, information regarding a sequence of carrier frequencies available for communications from a transmitter device to the receiver device and obtaining, by the receiver device, information regarding a different sequence of medium sensing occasions for each carrier frequency of the sequence of carrier frequencies. The method may further include controlling sequentially switching, by the receiver device, between carrier frequencies of the sequence of carrier frequencies for receiving communications from the transmitter device based upon monitoring of a current carrier frequency of the sequence of carrier frequencies by the receiver device during a period other than medium sensing occasions of the sequence of medium sensing occasions for the current carrier frequency.

In an additional aspect of the disclosure, an apparatus configured for wireless communication may include means for obtaining, by a receiver device, information regarding a sequence of carrier frequencies available for communications from a transmitter device to the receiver device and means for obtaining, by the receiver device, information regarding a different sequence of medium sensing occasions for each carrier frequency of the sequence of carrier frequencies. The apparatus may further include means for controlling sequentially switching, by the receiver device, between carrier frequencies of the sequence of carrier frequencies for receiving communications from the transmitter device based upon monitoring of a current carrier frequency of the sequence of carrier frequencies by the receiver device during a period other than medium sensing occasions of the sequence of medium sensing occasions for the current carrier frequency.

In an additional aspect of the disclosure, program code for performing wireless communication may include program code to obtain, by a receiver device, information regarding a sequence of carrier frequencies available for communications from a transmitter device to the receiver device and program code to obtain, by the receiver device, information regarding a different sequence of medium sensing occasions for each carrier frequency of the sequence of carrier frequencies. The program code may further include program code control sequentially switching, by the receiver device, between carrier frequencies of the sequence of carrier frequencies for receiving communications from the transmitter device based upon monitoring of a current carrier frequency of the sequence of carrier frequencies by the receiver device during a period other than medium sensing occasions of the sequence of medium sensing occasions for the current carrier frequency.

In an additional aspect of the disclosure, an apparatus configured for wireless communication may include at least one processor configured to obtain, by a receiver device, information regarding a sequence of carrier frequencies available for communications from a transmitter device to the receiver device and to obtain, by the receiver device, information regarding a different sequence of medium sensing occasions for each carrier frequency of the sequence of carrier frequencies. The at last one processor may be further configured to control sequentially switching, by the receiver device, between carrier frequencies of the sequence of carrier frequencies for receiving communications from the transmitter device based upon monitoring of a current carrier frequency of the sequence of carrier frequencies by the receiver device during a period other than medium sensing occasions of the sequence of medium sensing occasions for the current carrier frequency.

In an additional aspect of the disclosure, a method of wireless communication may include monitoring, by a transmitter device, for an event in a medium sensing occasion of a sequence of medium sensing occasions for a current carrier frequency of a sequence of carrier frequencies, wherein the sequence of carrier frequencies comprise a plurality of carrier frequencies available for communications from the transmitter device to a receiver device, and wherein a different sequence of medium sensing occasions is defined for each carrier frequency of the sequence of carrier frequencies in which a beginning of each medium sensing occasion of the sequence of medium sensing occasions for a carrier frequency of the sequence of carrier frequencies is offset from a beginning of each respective medium sensing occasion of the sequence of medium sensing occasions for another carrier frequency of the sequence of carrier frequencies by at least a tuning guard period. The method may further include controlling sequentially switching, by the transmitter device, between carrier frequencies of the sequence of carrier frequencies for transmitting from the transmitter device to the receiver device based upon the monitoring.

In an additional aspect of the disclosure, an apparatus configured for wireless communication may include means for monitoring, by a transmitter device, for an event in a medium sensing occasion of a sequence of medium sensing occasions for a current carrier frequency of a sequence of carrier frequencies, wherein the sequence of carrier frequencies include a plurality of carrier frequencies available for communications from the transmitter device to a receiver device, and wherein a different sequence of medium sensing occasions is defined for each carrier frequency of the sequence of carrier frequencies in which a beginning of each medium sensing occasion of the sequence of medium sensing occasions for a carrier frequency of the sequence of carrier frequencies is offset from a beginning of each respective medium sensing occasion of the sequence of medium sensing occasions for another carrier frequency of the sequence of carrier frequencies by at least a tuning guard period. The method may further include means for controlling sequentially switching, by the transmitter device, between carrier frequencies of the sequence of carrier frequencies for transmitting from the transmitter device to the receiver device based upon the monitoring.

In an additional aspect of the disclosure, program code for performing wireless communication may include program code to monitor, by a transmitter device, for an event in a medium sensing occasion of a sequence of medium sensing occasions for a current carrier frequency of a sequence of carrier frequencies, wherein the sequence of carrier frequencies comprise a plurality of carrier frequencies available for communications from the transmitter device to a receiver device, and wherein a different sequence of medium sensing occasions is defined for each carrier frequency of the sequence of carrier frequencies in which a beginning of each medium sensing occasion of the sequence of medium sensing occasions for a carrier frequency of the sequence of carrier frequencies is offset from a beginning of each respective medium sensing occasion of the sequence of medium sensing occasions for another carrier frequency of the sequence of carrier frequencies by at least a tuning guard period, wherein the sequence of carrier frequencies include a plurality of carrier frequencies available for communications from the transmitter device to a receiver device. The program code may further include program code to control sequentially switching, by the transmitter device, between carrier frequencies of the sequence of carrier frequencies for transmitting from the transmitter device to the receiver device based upon the monitoring.

In an additional aspect of the disclosure, an apparatus configured for wireless communication may include at least one processor configured to monitor, by a transmitter device, for an event in a medium sensing occasion of a sequence of medium sensing occasions for a current carrier frequency of a sequence of carrier frequencies, wherein the sequence of carrier frequencies comprise a plurality of carrier frequencies available for communications from the transmitter device to a receiver device, and wherein a different sequence of medium sensing occasions is defined for each carrier frequency of the sequence of carrier frequencies in which a beginning of each medium sensing occasion of the sequence of medium sensing occasions for a carrier frequency of the sequence of carrier frequencies is offset from a beginning of each respective medium sensing occasion of the sequence of medium sensing occasions for another carrier frequency of the sequence of carrier frequencies by at least a tuning guard period. The at least one processor may further be configured to control sequentially switching, by the transmitter device, between carrier frequencies of the sequence of carrier frequencies for transmitting from the transmitter device to the receiver device based upon the monitoring.

In one aspect of the disclosure, a method of wireless communication includes dividing, by a base station, a system bandwidth into a plurality of frequency transmission units, wherein the base station operates in a frame-based equipment (FBE) mode, configuring, by the base station, a pattern of sensing locations in each frame for each frequency transmission unit of the plurality of frequency transmission units, wherein an inter-unit delay of sensing locations between a first frequency transmission unit of the plurality of frequency transmission units and a next adjacent frequency transmission unit of the plurality of frequency transmission units and between a last frequency transmission unit of the plurality of frequency transmission units and the first frequency transmission unit is a fixed duration, and signaling, by the base station, an indication identifying the plurality of frequency transmission units and the pattern of sensing locations to one or more served user equipments (UEs).

In an additional aspect of the disclosure, a method of wireless communication includes dividing, by a base station, a system bandwidth into an anchor frequency transmission unit having a first bandwidth and one or more opportunistic frequency transmission units having each having another bandwidth, configuring, by the base station, a pattern of sensing locations in each frame for the anchor frequency transmission unit and the one or more opportunistic frequency transmission units, wherein an inter-unit delay of sensing locations between the anchor frequency transmission unit and a next adjacent frequency transmission unit of the one or more opportunistic frequency transmission units is within a minimum duration, and signaling, by the base station, an indication identifying the anchor frequency transmission unit, the one or more opportunistic frequency transmission units, and the pattern of sensing locations to one or more served UEs.

In an additional aspect of the disclosure, an apparatus of wireless communication includes means for dividing, by a base station, a system bandwidth into a plurality of frequency transmission units, wherein the base station operates in a FBE mode, means for configuring, by the base station, a pattern of sensing locations in each frame for each frequency transmission unit of the plurality of frequency transmission units, wherein an inter-unit delay of sensing locations between a first frequency transmission unit of the plurality of frequency transmission units and a next adjacent frequency transmission unit of the plurality of frequency transmission units and between a last frequency transmission unit of the plurality of frequency transmission units and the first frequency transmission unit is a fixed duration, and means for signaling, by the base station, an indication identifying the plurality of frequency transmission units and the pattern of sensing locations to one or more served UEs.

In an additional aspect of the disclosure, an apparatus of wireless communication includes means for dividing, by a base station, a system bandwidth into an anchor frequency transmission unit having a first bandwidth and one or more opportunistic frequency transmission units having each having another bandwidth, means for configuring, by the base station, a pattern of sensing locations in each frame for the anchor frequency transmission unit and the one or more opportunistic frequency transmission units, wherein an inter-unit delay of sensing locations between the anchor frequency transmission unit and a next adjacent frequency transmission unit of the one or more opportunistic frequency transmission units is within a minimum duration, and means for signaling, by the base station, an indication identifying the anchor frequency transmission unit, the one or more opportunistic frequency transmission units, and the pattern of sensing locations to one or more served UEs.

In an additional aspect of the disclosure, a non-transitory computer-readable medium having program code recorded thereon. The program code further includes program code executable by a computer for causing the computer to divide, by a base station, a system bandwidth into a plurality of frequency transmission units, wherein the base station operates in a FBE mode, program code executable by the computer for causing the computer to configure, by the base station, a pattern of sensing locations in each frame for each frequency transmission unit of the plurality of frequency transmission units, wherein an inter-unit delay of sensing locations between a first frequency transmission unit of the plurality of frequency transmission units and a next adjacent frequency transmission unit of the plurality of frequency transmission units and between a last frequency transmission unit of the plurality of frequency transmission units and the first frequency transmission unit is a fixed duration, and program code executable by the computer for causing the computer to signal, by the base station, an indication identifying the plurality of frequency transmission units and the pattern of sensing locations to one or more served UEs.

In an additional aspect of the disclosure, a non-transitory computer-readable medium having program code recorded thereon. The program code further includes program code executable by a computer for causing the computer to divide, by a base station, a system bandwidth into an anchor frequency transmission unit having a first bandwidth and one or more opportunistic frequency transmission units having each having another bandwidth, program code executable by the computer for causing the computer to configure, by the base station, a pattern of sensing locations in each frame for the anchor frequency transmission unit and the one or more opportunistic frequency transmission units, wherein an inter-unit delay of sensing locations between the anchor frequency transmission unit and a next adjacent frequency transmission unit of the one or more opportunistic frequency transmission units is within a minimum duration, and program code executable by the computer for causing the computer to signal, by the base station, an indication identifying the anchor frequency transmission unit, the one or more opportunistic frequency transmission units, and the pattern of sensing locations to one or more served UEs.

In an additional aspect of the disclosure, an apparatus configured for wireless communication is disclosed. The apparatus includes at least one processor; and a memory coupled to the at least one processor. The processor is configured to divide, by a base station, a system bandwidth into a plurality of frequency transmission units, wherein the base station operates in a FBE mode, to configure, by the base station, a pattern of sensing locations in each frame for each frequency transmission unit of the plurality of frequency transmission units, wherein an inter-unit delay of sensing locations between a first frequency transmission unit of the plurality of frequency transmission units and a next adjacent frequency transmission unit of the plurality of frequency transmission units and between a last frequency transmission unit of the plurality of frequency transmission units and the first frequency transmission unit is a fixed duration, and to signal, by the base station, an indication identifying the plurality of frequency transmission units and the pattern of sensing locations to one or more served UEs.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
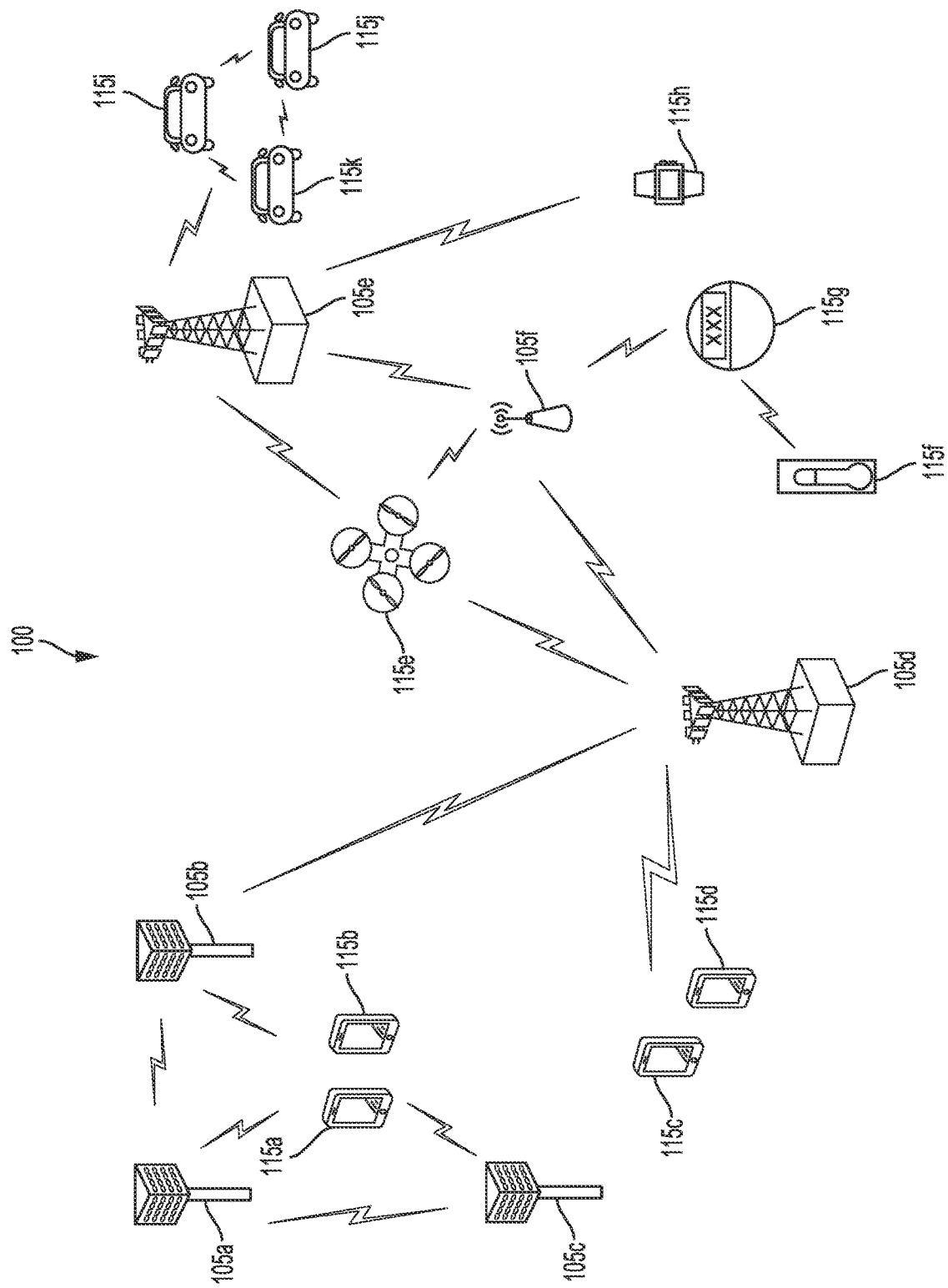
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably. An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km²), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
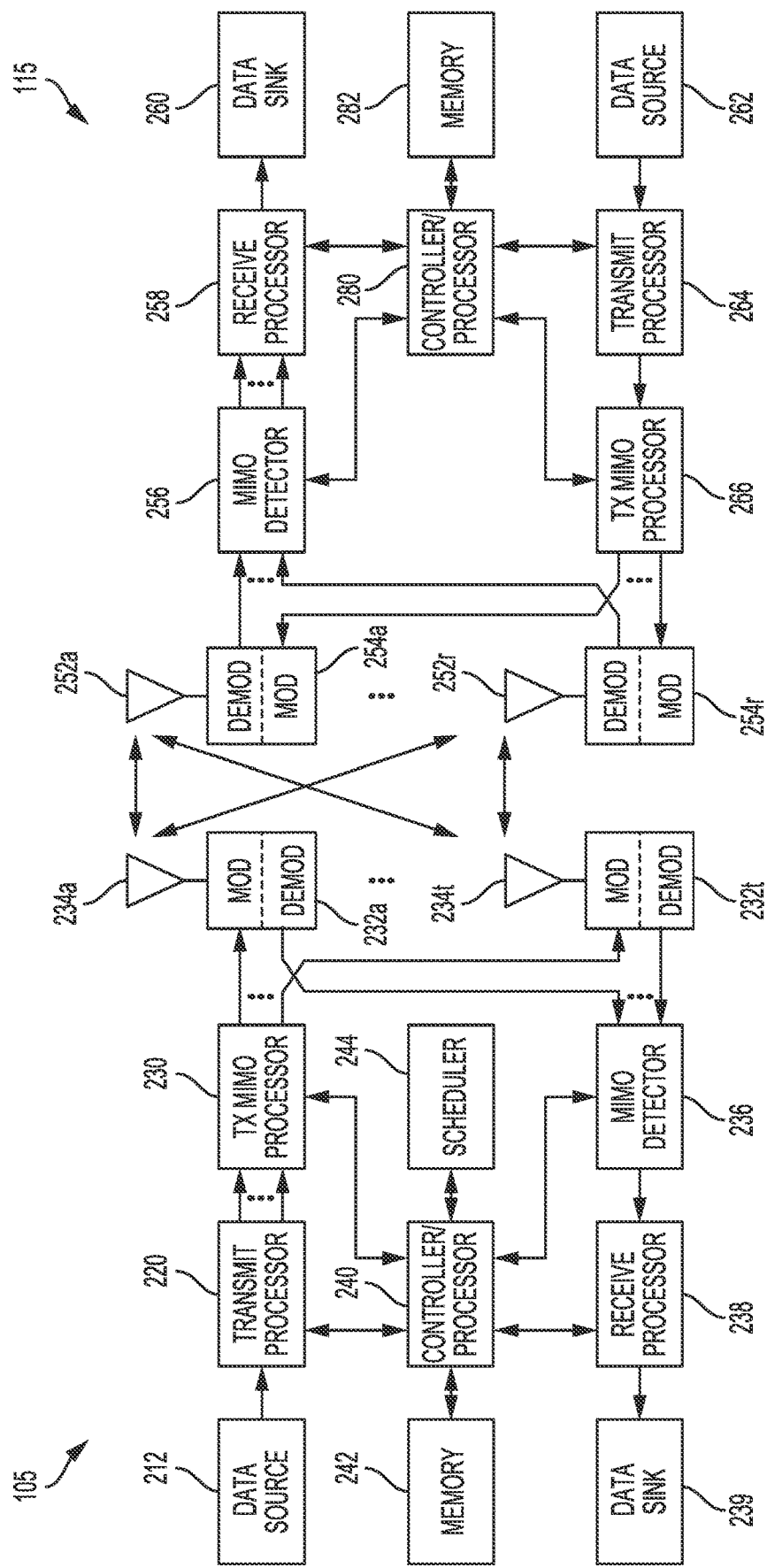
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of functional blocks illustrated in FIGS. 5, 7, 11A, 11B, 12A, and 12B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. For example, receiver nodes can be subject to hidden node interference, which can effectively create outage events wherein a receiver device is blocked from receiving communications via the medium. There could also be other issues, such the inability to access the medium on a given frequency due to congestion. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
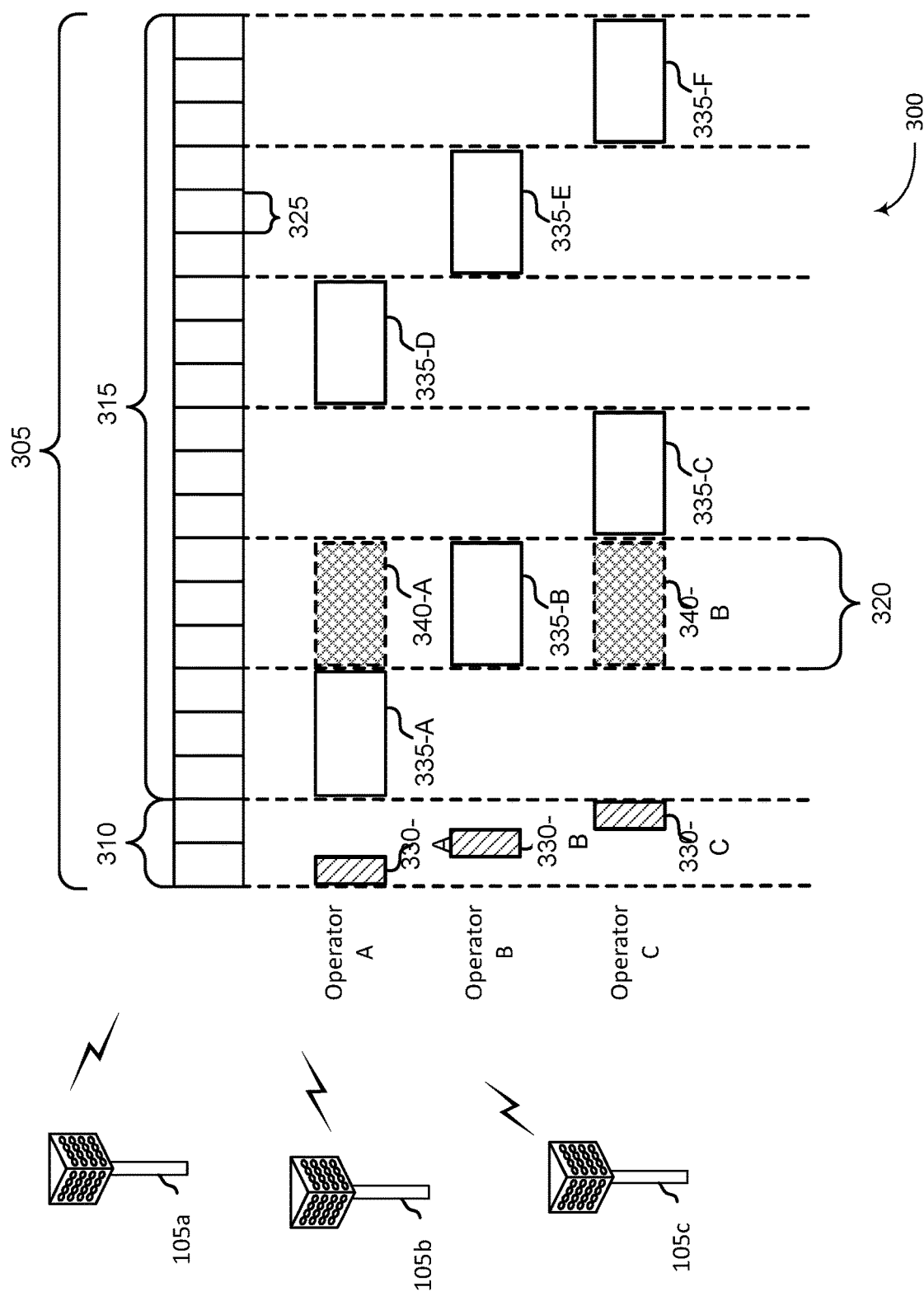
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIB s)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-*d* may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain 0-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Different regions may have different regulatory requirements for communication operations over an unlicensed band. Some regulations may mandate the equipment operating on unlicensed spectrum to implement an LBT procedure, such as by performing a clear channel assessment (CCA), before starting a transmission to verify that the operating channel is not occupied. On the unlicensed 5 GHz band, two of modes of operation have been suggested: frame-based equipment (FBE), and load-based equipment (LBE).

FBE is the equipment in which the transmit/receive structure may not be directly demand-driven, but, instead, operates according to fixed timing. LBT/CCA may therefore be performed periodically at predefined time instances according to a predetermined frame structure, such as:

$$\text{Fixed-Frame Period} = \text{channel occupancy time (CoT)} + \text{idle period} \qquad (1)$$

Where the fixed frame period (e.g., 1-10 ms) represents the periodicity over which the LBT/CCA may be performed, the CoT represents the total time during which equipment has transmissions during the fixed-frame period on a given channel without re-evaluating the availability of that channel, and the idle period represents the total time within the fixed-frame period, during which the equipment has no transmissions. Some regulations provide that the idle period should be at least 5% of the channel occupancy time in any given fixed-frame period. If the equipment finds the operating channel(s) to be clear, it may then transmit immediately. Otherwise, if the equipment finds the operating channel occupied, it would not transmit on that channel during the remainder of the current fixed-frame period.

Unlike for FBE, load-based equipment is not restricted to perform LBT/CCA according to a fixed frame structure. Instead, LBE may perform LBT/CCA on an ad hoc basis, whenever it has data to transmit. Before a transmission on an operating channel, an LBE would perform a CCA to detect the energy on the channel. If the equipment finds the operating channel(s) to be clear, it may transmit immediately. The total time that an LBE makes use of an operating channel is the maximum channel occupancy time (MCOT). In one example implementation, MCOT may be less than $(13/32) \times q$ milliseconds, where $q = \{4 \ldots 32\}$. (E.g., when $q=32$, the MCOT=13 ms). Otherwise, if the equipment finds an operating channel occupied, it will not immediately transmit on the channel, but will perform an Extended CCA (ECCA) at a later time during the MCOT. For example, the LBE would observe the operating channel for the duration of a random factor N multiplied by the CCA observation time. N represents the number of clear idle slots resulting in a total idle period that the LBE would observe before initiation of the transmission. The value of N may be randomly selected in the range $1 \ldots q$ every time an ECCA is to be performed. N may be stored in a counter which is decremented every time a CCA slot is considered to be "unoccupied". When the counter reaches zero, the LBT may transmit.

FBE mode operations have been proposed for use in industrial IoT (IIoT) applications where a single operator may control the communication environment in the unlicensed spectrum. With single operator FBE, the NR network design can be largely mapped to NR-U. However, even with a controlled IIoT deployment, a given operating channel may still encounter interference. Network designs for such controlled IIoT deployments should still consider solutions to handle such potential interference/signal outage problems.

One suggested solution has proposed the use of opportunistic frequency switching in which a participating base station may switch to another frequency or bandwidth part (BWP) when the current frequency or BWP of the channel suffers from interference. This frequency switching is designed to introduce a minimum delay between adjacent or successive available frequency transmission units. For purposes of this disclosure, a frequency transmission unit includes individual carrier frequencies or different BWP within a system bandwidth.

The switching mechanism may be an opportunistic functionality, which does not need to be activated when the communications on a given carrier are reliable. A flexible network control procedure may be designed to utilize the opportunistic frequency switching on an as needed basis. In operation, a UE may perform a cell selection procedure and, after detecting the synchronization signal block (SSB) would acquire corresponding system information (e.g., SIB s, MIB, etc.). A system information message on each carrier frequency or BWP can point to another or multiple other "linked" carrier frequencies or BWPs used for the opportunistic frequency switching. The system information also contain an indication of one or more sensing occasions for each of the linked carriers or frequency transmission units.

Figure 4:
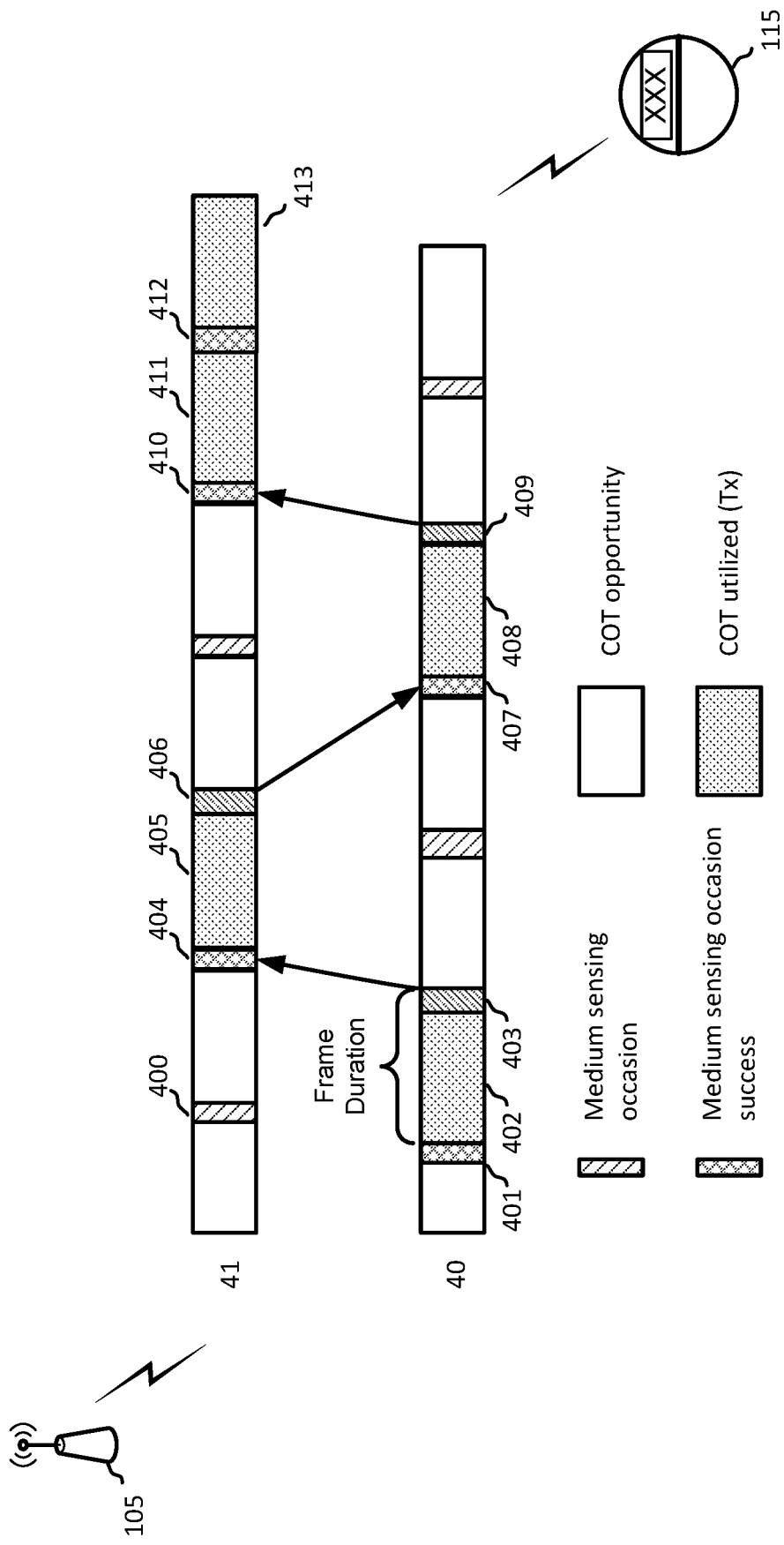
FIG. 4 is a block diagram illustrating a base station and UE in an FBE mode communication network that uses opportunistic frequency switching.

FIG. 4 is a block diagram illustrating a base station 105 and UE 115 in an FBE mode communication network that uses opportunistic frequency switching. Two frequency transmission units 40 and 41 are illustrated. Frequency transmission units 40 and 41 may be independent carrier frequencies or may be different BWPs of a system bandwidth. Base station 105 and UE 115 may be in sync with regard to medium sensing occasions (also referred to herein as medium sensing locations) 400 for each of frequency transmission units 40 and 41. Medium sensing occasions 400 for each of frequency transmission units 40 and 41 are pre-determined. Base station 105 would signal the locations of medium sensing occasions 400 to any served UEs, such as UE 115. If UE 115 does not decode any signal from base station 105 on frequency transmission unit 40 after medium sensing occasions 400 (e.g., preamble, channel state information reference signals (CSI-RS), demodulation reference signals (DMRS), downlink control indicator (DCI), or other such common signals), UE 115 retunes to frequency transmission unit 41 and monitors signaling after corresponding medium sensing occasions 400. If a given frequency transmission unit does not suffer from interference, the network (base station 105) can remain on the same frequency transmission unit.

As illustrated, with base station 105 transmitting to UE 115 using frequency transmission unit 40, after medium sensing occasion success 401, a transmission may occur within the channel occupancy time (CoT) 402. On medium sensing occasion failure 403, base station 105 tunes to frequency transmission unit 41 (e.g., an additional carrier frequency or BWP), for medium sensing occasion success 404. The inter-unit delay between the failed medium sensing at medium sensing occasion failure 403 and the next medium sensing occasion at medium sensing occasion success 404 may be minimized to reduce the switching time delay between frequency transmission units.

After medium sensing occasion success 404, a transmission occurs at CoT 405. Upon medium sensing occasion failure 406 in frequency transmission unit 41, base station 105 would re-tune to frequency transmission unit 40 to perform medium sensing at medium sensing occasion success 407. As noted below, the inter-unit delay for switching from frequency transmission unit 41 back to frequency transmission unit 40 may be longer. A transmission occurs at CoT 408 on frequency transmission unit 40. After medium sensing occasion failure 409, base station 105 would again re-tune to frequency transmission unit 41 to perform medium sensing occasion success 410. A transmission would occur at CoT 411. After medium sensing occasion success 412, base station 105 would remain on frequency transmission unit 41 for transmissions at CoT 413.

In the previous suggested solutions, the gap between sensing occasions on frequency transmission units 40 and 41 can be selected such that it includes the processing time of UE 115 to decode the common signals (e.g., preamble, CSI-RS, DMRS, DCI, etc.) to determine whether base station 105 occupies the medium or not and the frequency retuning time of UE 115. For example, when UE 115 uses one slot time to process presence signal of base station 105 and to re-tune to frequency transmission unit 41, medium sensing occasions 400 on frequency transmission units 40 and 41 can have a one slot gap. However, designing a minimum delay that is uniform in both directions may not be possible. Thus, after medium sensing occasion failure 406 on frequency transmission unit 41, the inter-unit delay for base station 105 and UE 115 to switch from frequency transmission unit 41 to frequency transmission unit 40 may be longer than the inter-unit delay switching from frequency transmission unit 40 to frequency transmission unit 41. When the frame duration is M slots, the inter-unit delay from frequency transmission unit to frequency transmission unit 41 is N slots and the inter-unit delay from frequency transmission unit 41 to frequency transmission unit 40 would be M-N slots. When N=1 to minimize the delay from frequency transmission unit 40 to frequency transmission unit 41, the delay from frequency transmission unit 41 to frequency transmission unit 40 becomes M−1 slots.

It should be noted that such inter-unit delay minimization may be very important for ultra-reliable low latency communication (URLLC) traffic.

Figure 5:
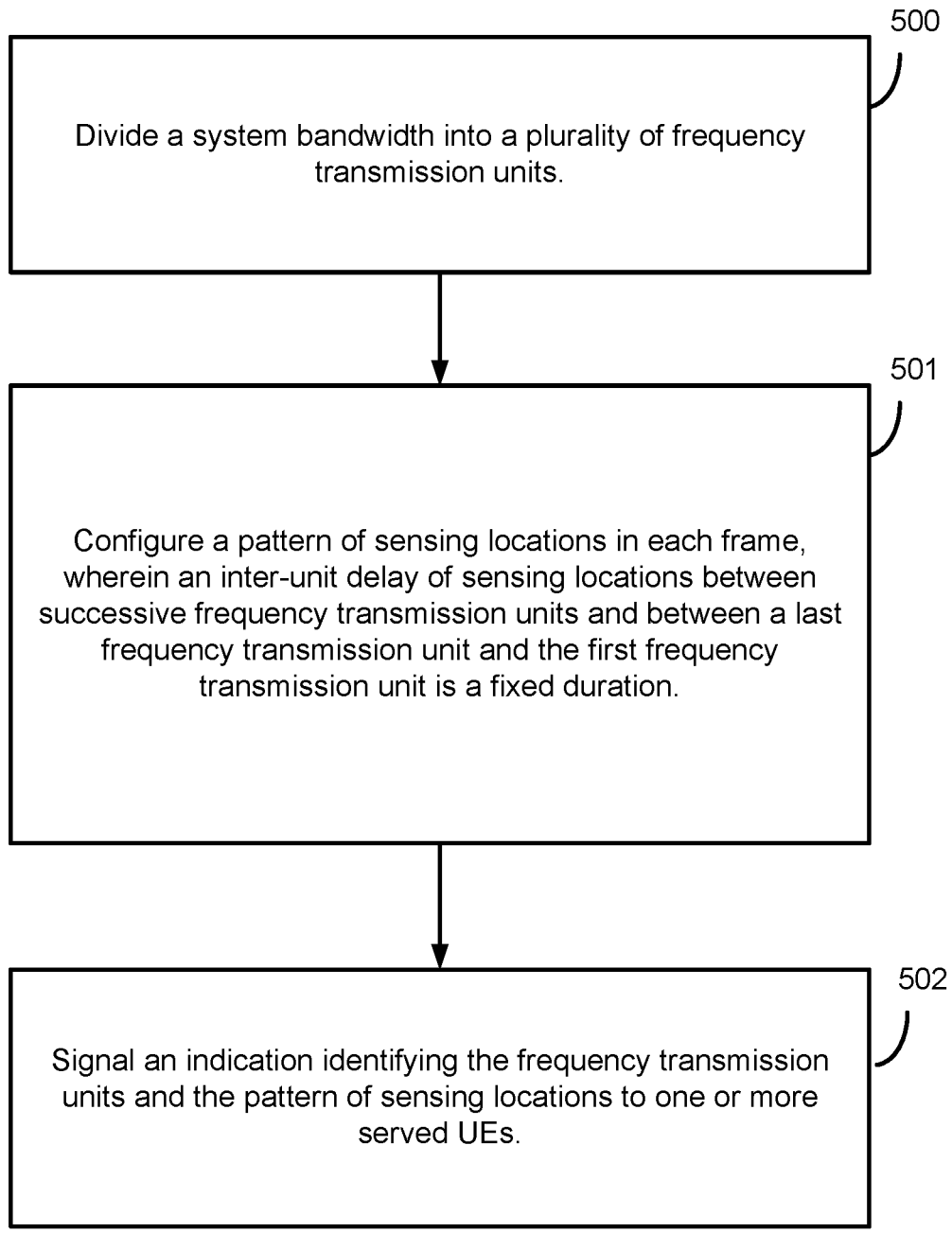
FIG. 5 is a block diagram illustrating example blocks executed to implement one aspect of the present disclosure.
Figure 9:
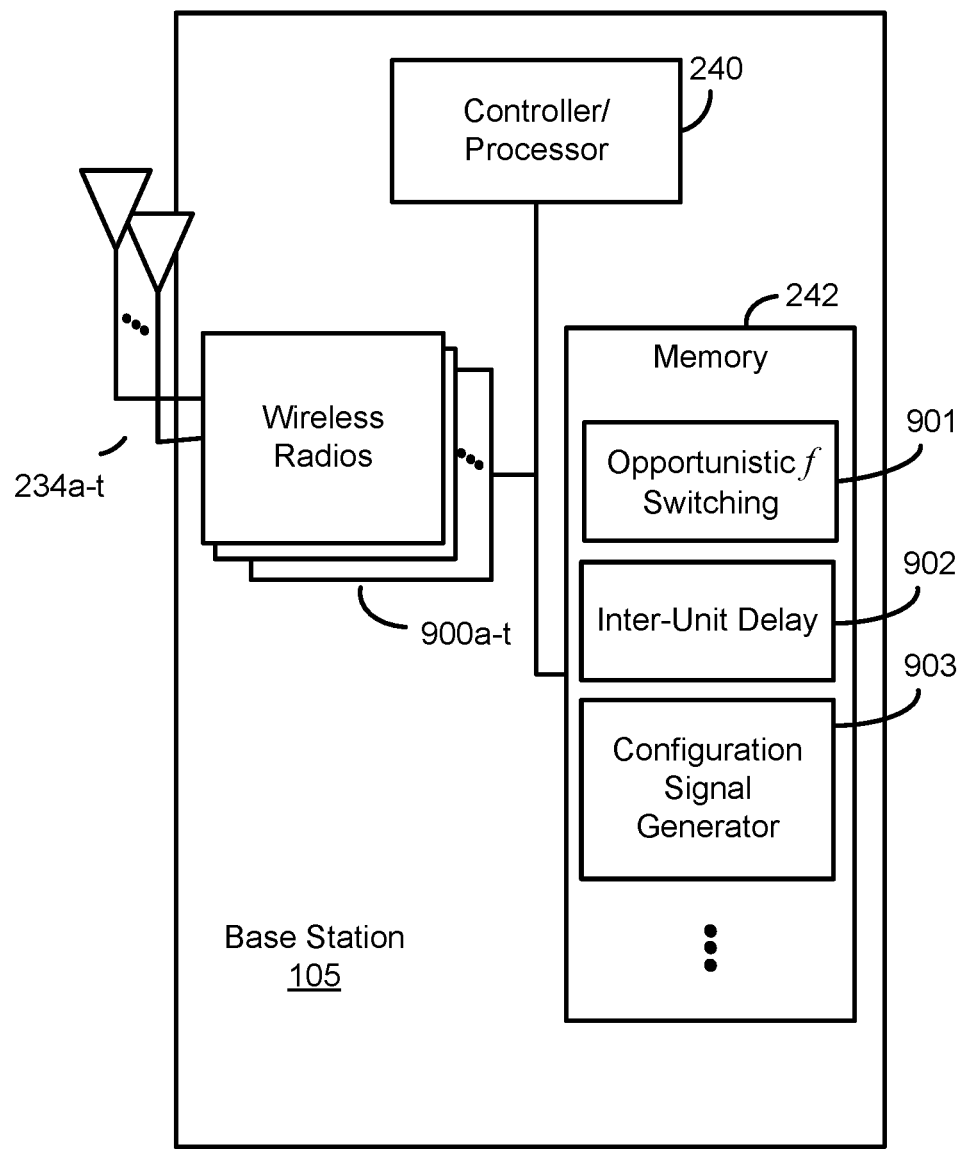
FIG. 9 is a block diagram illustrating a base station configured according to one aspect of the present disclosure.

FIG. 5 is a block diagram illustrating example blocks executed to implement one aspect of the present disclosure. The example blocks will also be described with respect to base station 105 as illustrated in FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 900a-900t and antennas 234a-234t. Wireless radios 900a-t includes various components and hardware, as illustrated in FIG. 2 for base station 105, including modulator/demodulators 232a-232t, MIMO detector 236, receive processor 238, transmit processor 220, and TX MIMO processor 230.

At block 500, a base station divides a system bandwidth into a plurality of frequency transmission units, wherein the base station operates in a frame-based equipment (FBE) mode. The frequency transmission units may be individual carrier frequencies or may be different BWPs of the system bandwidth. A base station, such as base station 105, under control of controller/processor 240, executes opportunistic frequency switching logic 901, stored in memory 242. The execution environment of opportunistic frequency switching logic 901 provides for base station 105 to divide the assigned system bandwidth into multiple frequency transmission units (e.g., carrier frequencies, BWPs, etc.).

At block 501, the base station configures a pattern of sensing locations in each frame for each frequency transmission unit, wherein an inter-unit delay of sensing locations between a successive frequency transmission units and between the last frequency transmission unit and the first frequency transmission unit is a fixed duration. In the example aspect, the inter-unit delay between each successful frequency transmission unit and between the last and first frequency transmission units is configured to be a fixed duration. Base station 105, under control of controller/processor 240, executes inter-unit delay logic 902, stored in memory 242. The execution environment of inter-unit delay logic 902 provides for base station 105 to configure the pattern of sensing locations, such that the inter-unit delay between sensing locations at each successive frequency transmission unit is the fixed amount. This fixed amount is also present for a switch between the last frequency transmission unit of the group and the first frequency transmission unit.

At block 502, the base station signals an indication identifying the plurality of frequency transmission units and the pattern of sensing locations to one or more served UEs. Base station 105 signals each of the served UEs configuration signaling that identifies both the information on the plurality of frequency transmission units used for this fixed frame period, and the pattern of sensing locations that have been configured to reflect the fixed duration inter-unit delay. Base station 105, under control of controller/processor 240, executes configuration signal generator 903, stored in memory 242. The execution environment of configuration signal generator 903 uses the information on the plurality of frequency transmission units determined via opportunistic frequency switching logic 901 and the pattern of sensing locations that were configured using inter-unit delay logic 902 to generate a configuration signal. Base station 105 would then transmit the resulting configuration signal via wireless radios 900a-900t and antennas 234a-234t.

Figure 6:
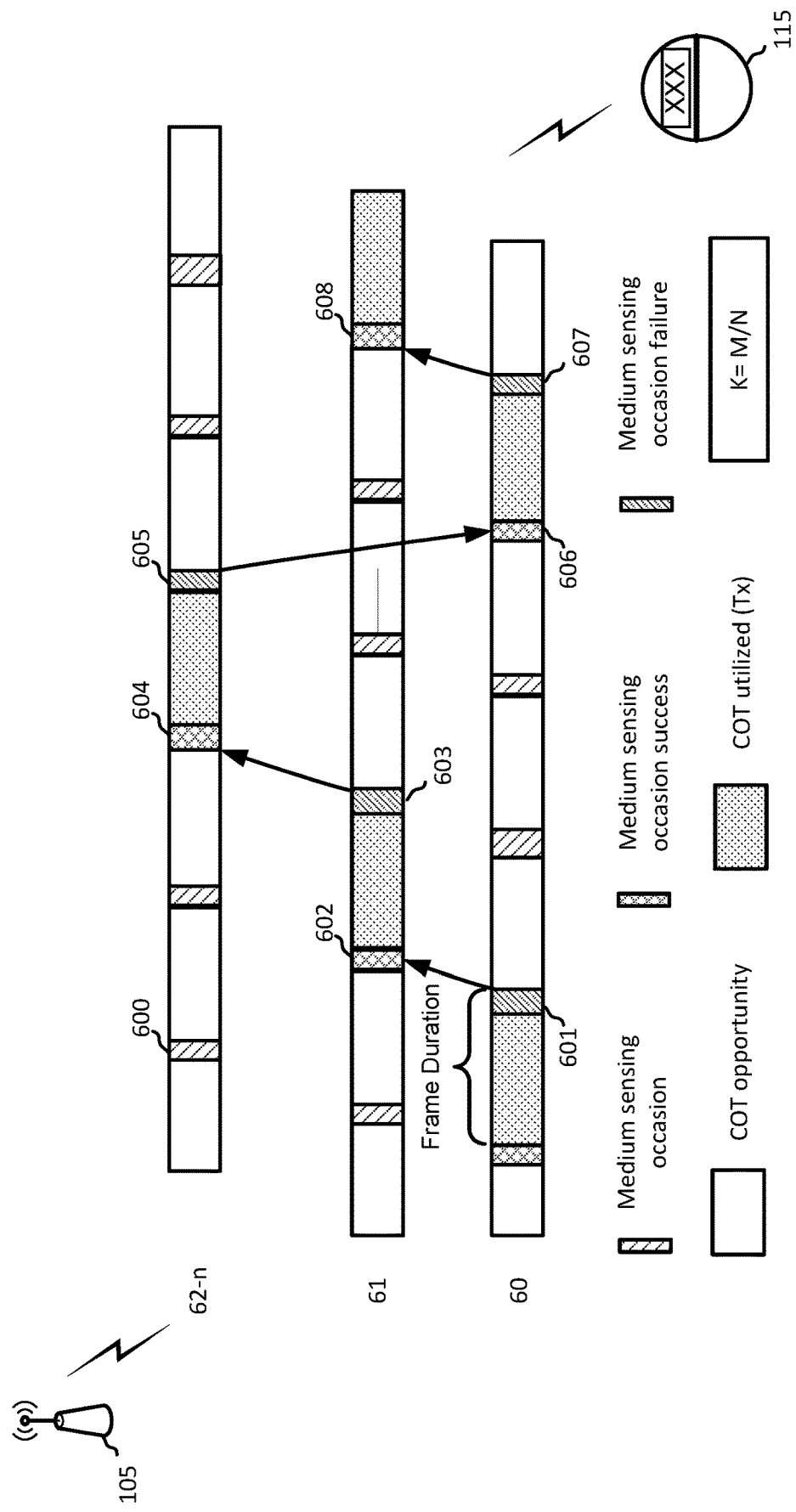
FIG. 6 is a block diagram illustrating a base station configured according to one aspect of the present disclosure.

FIG. 6 is a block diagram illustrating a base station 105 configured according to one aspect of the present disclosure. Base station 105 provides communications with UE 115 via FBE mode operations. According to the described aspect, base station 105 employs more frequency transmission units (e.g., carrier frequencies/BWPs) for opportunistic frequency switching with uniform inter-unit delay between each adjacent frequency transmission unit. When the minimum delay can be designed to be N slots, with frame duration of M slots, the number of frequency transmission units may be up to MIN. In this aspect, when one frequency suffers from interference, the very next frequency for sensing may be switched to by base station 105 and UE 115 with an N slot delay. In this design, in order to achieve the minimum delay when base station 105 encounters interference and should switch to the next frequency transmission unit, a higher number of frequency transmission units may be more beneficial. In fact, base station 105 may divide the entire system bandwidth into multiple frequency transmission units. However, the more frequency transmission units that are used for opportunistic switching, the smaller the bandwidth there will be on a given active channel.

As illustrated, base station 105 divides the system bandwidth into frequency transmission units 60-62-*n*. The pattern of medium sensing occasions 600 for each of frequency transmission units 60-62-*n* are configured such that the inter-unit delay between sensing occasions of each successive frequency transmission unit is a fixed duration. Thus, the inter-unit delay between each failing sensing occasion (medium sensing occasions 601, 603, 605, and 607) and the next sensing occasion (medium sensing occasions success 602, 604, 606, and 608) of the next frequency transmission unit will be the same, fixed duration, including the inter-unit delay between the last frequency transmission unit, frequency transmission unit 62-*n* and the first, frequency transmission unit 60.

Figure 7:
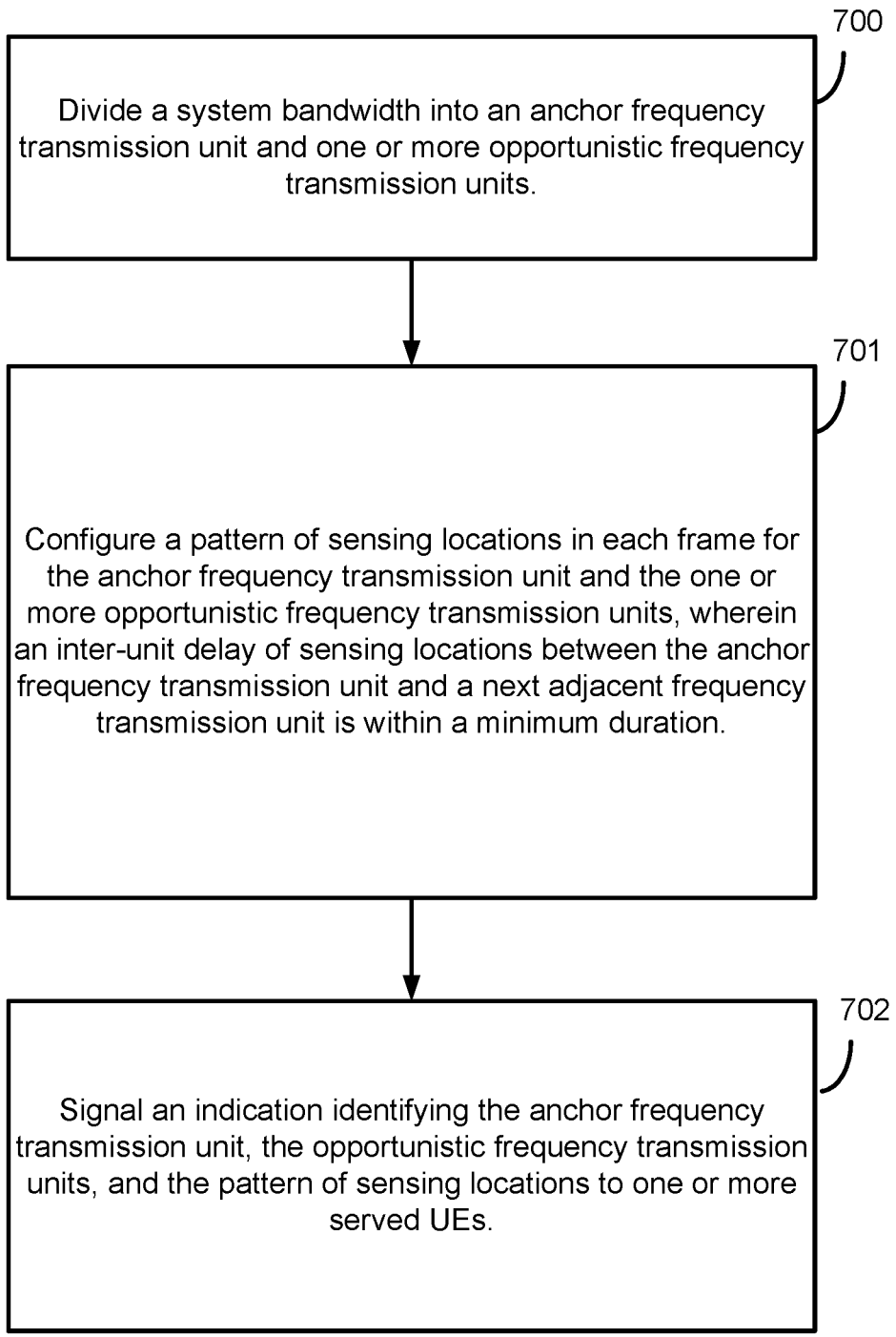
FIG. 7 is a block diagram illustrating example blocks executed to implement one aspect of the present disclosure.

FIG. 7 is a block diagram illustrating example blocks executed to implement one aspect of the present disclosure. The example blocks will also be described with respect to base station 105 as illustrated in FIG. 9.

At block 700, a base station divides a system bandwidth into an anchor frequency transmission unit and one or more opportunistic frequency transmission units. A base station, such as base station 105, under control of controller/processor 240, executes opportunistic frequency switching logic 901, stored in memory 242. The execution environment of opportunistic frequency switching logic 901 in the presently described aspect provides for base station 105 to divide the allocated system bandwidth into an anchor frequency transmission unit (e.g., an anchor carrier, an anchor BWP, etc.), and one or more additional frequency transmission units that can be used opportunistically to switch to when interference is experienced on the anchor frequency transmission unit. The anchor frequency transmission unit may have a different, larger bandwidth than the other frequency transmission units.

At block 701, the base station configures a pattern of sensing locations in each frame for the anchor frequency transmission unit and the one or more opportunistic frequency transmission units, wherein an inter-unit delay of sensing locations between the anchor frequency transmission unit and a next adjacent frequency transmission unit of the one or more opportunistic frequency transmission units is within a minimum duration. In the example aspect, the inter-unit delay between the anchor frequency transmission unit and the next frequency transmission unit is configured to have a minimized duration. Base station 105, under control of controller/processor 240, executes inter-unit delay logic 902, stored in memory 242. The execution environment of inter-unit delay logic 902 of the presently described aspect provides for base station 105 to configure the pattern of sensing locations, such that the inter-unit delay when switching between sensing locations at the anchor frequency transmission unit to the next frequency transmission unit is of the minimum duration to accommodate the signal processing and frequency retuning of both base station 105 and UE 115.

It should be noted that, according to the example aspect described with respect to FIG. 7, the inter-unit delay is only minimized for switching from the anchor frequency transmission unit to the next frequency transmission unit. Switching back from the next frequency transmission unit to the anchor frequency transmission unit may be a longer duration. However, base station 105 may still select to switch back to the anchor frequency transmission unit on the subsequent frame, without first attempting to sense on the next frequency transmission unit on the non-anchor frequency.

At block 702, the base station signals an indication identifying the anchor frequency transmission unit, the one or more opportunistic frequency transmission units, and the pattern of sensing locations to one or more served UEs. Base station 105, under control of controller/processor 240, executes configuration signal generator 903, stored in memory 242. The execution environment of configuration signal generator 903 uses the information on the plurality of frequency transmission units determined via opportunistic frequency switching logic 901 and the pattern of sensing locations that were configured using inter-unit delay logic 902 to generate a configuration signal. Base station 105 would then transmit the resulting configuration signal via wireless radios 900*a*-900*t* and antennas 234*a*-234*t*.

Figure 8:
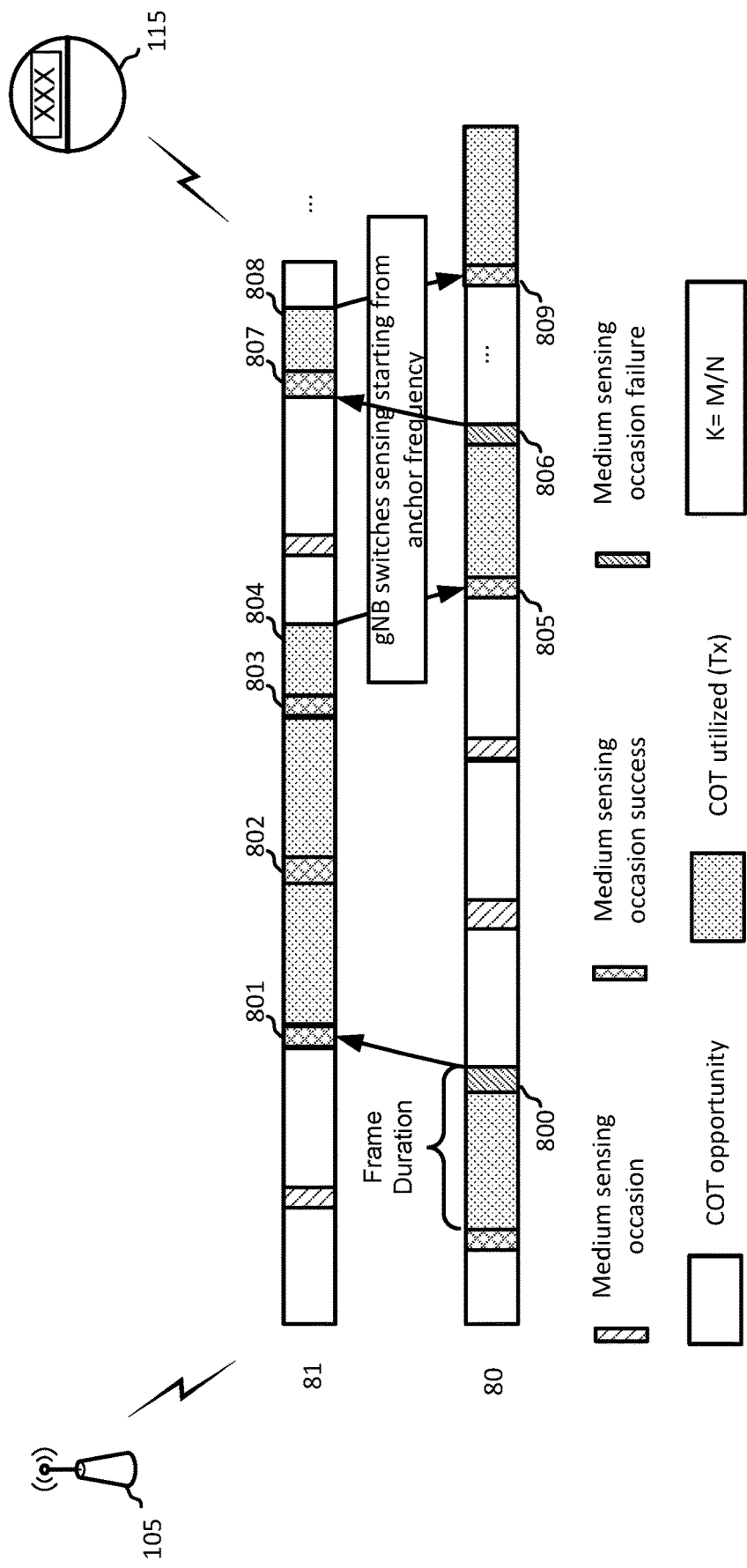
FIG. 8 is a block diagram illustrating a base station configured according to one aspect of the present disclosure.

FIG. 8 is a block diagram illustrating a base station 105 and UE 115 communicating in an FBE mode network configured according to one aspect of the present disclosure. According to the illustrated example, base station 105 divides the allocated system bandwidth into anchor frequency transmission unit 80 and additional frequency transmission unit 81, which may be used for opportunistic frequency switching when interference is detected on anchor frequency transmission unit 80. As discussed with respect to FIG. 7, the inter-unit delay in switching from anchor frequency transmission unit 80 to additional frequency transmission unit 81 is minimized according to the minimum processing time. However, the inter-unit delay from additional frequency transmission unit 81 to anchor frequency transmission unit may not be minimized. Thus, the transitions after the unsuccessful medium sensing at anchor frequency transmission unit 80 (e.g., medium sensing occasion failure 800 and 806) to the medium sensing occasions of additional frequency transmission unit 81 (e.g., medium sensing occasion success 801 and 807) occur at a minimized inter-unit delay. However, switching back from additional frequency transmission unit 81 to anchor frequency transmission unit 80 may occur at a larger inter-unit delay.

In order to address the difference in switching delays, when transmitting on additional frequency transmission unit 81 (or any other additional frequency transmission unit available for opportunistic switching) other than anchor frequency transmission unit 80, base station 105 can choose to switch back to start sensing from anchor frequency transmission unit 80 on the subsequent frame. Therefore, when base station 105 ends its transmissions at 804 and 808, prior to the end of the current frame, it may elect to switch back to anchor frequency transmission unit 80 for medium sensing occasion success 805 and 809. In such a manner, the negative impact of the additional time used to switch back to anchor frequency transmission unit 80 may be minimized by switching back as soon as transmission has ended prior to the end of the previous frame.

In one example implementation, base station 105 can choose to return to start sensing from anchor frequency transmission unit 80 when the measurement reports indicate that anchor frequency transmission unit 80 no longer suffers from interference. For example, after switching to additional frequency transmission unit 81 for medium sensing occasion success 801, base station 105 will continue to transmit on additional frequency transmission unit 81 after repeated success sensings at medium sensing occasion success 802 and 803. However, after medium sensing occasion success 803, base station 105 receives a measurement report that indicates that anchor frequency transmission unit 80 no longer suffers from interference. Therefore, after finishing transmissions at 804, base station 105 would elect to switch back to anchor frequency transmission unit 80.

In an additional example implementation, when the inter-unit gap is designed to be small with a minimum processing time of both base station 105 and UE 115, base station 105 may begin sensing from anchor frequency transmission unit 80 at every frame. For example, after medium sensing occasion failure 806, base station 105 switches to additional frequency transmission unit 81 for medium sensing occasion success 807 and transmission on additional frequency transmission unit 81. However, regardless of any measurement reports, base station 105 will switch back to anchor frequency transmission unit 80 after ending its transmission at 808 for medium sensing occasion success 809 on anchor frequency transmission unit 80 at the next frame.

In operation, base station 105 would signal to UE 115 to inform about how base station 105 will conduct any opportunistic frequency switching. For example, base station 105 may signal a particular sensing order of additional frequency transmission units for subsequent frames in the current CoT. Alternatively, base station 105 may signal an indication that the sensing will always start from anchor frequency transmission unit 80 in every frame.

Systems of 5G network 100, such as one or more base stations 105 and UEs 115, may be configured according to concepts of the present disclosure for implementing opportunistic frequency switching providing frequency diversity to avoid or mitigate medium access issues, such as outages due to hidden node interference, in contention-based shared spectrum (e.g., unlicensed spectrum, such as in the 2.4 GHz, 5 GHz, etc. unlicensed bands). Frequency diversity facilitated by embodiments is configured for FBE wireless medium access, wherein frequency switching implemented in providing the frequency diversity may be designed to introduce a minimum delay between adjacent or successive available frequency transmission units, as discussed above. As will be understood from the discussion below, opportunistic frequency switching procedures implemented according to embodiments may be configured, and even optimized, for FBE access rule compliance. For example, an opportunistic frequency switching procedure implemented in accordance with concepts of the present disclosure may provide European Telecommunications Standards Institute (ETSI) European Standard (EN) 301 893 compliance, such as for deployment with respect to a 5 GHz unlicensed band.

Figure 10A:
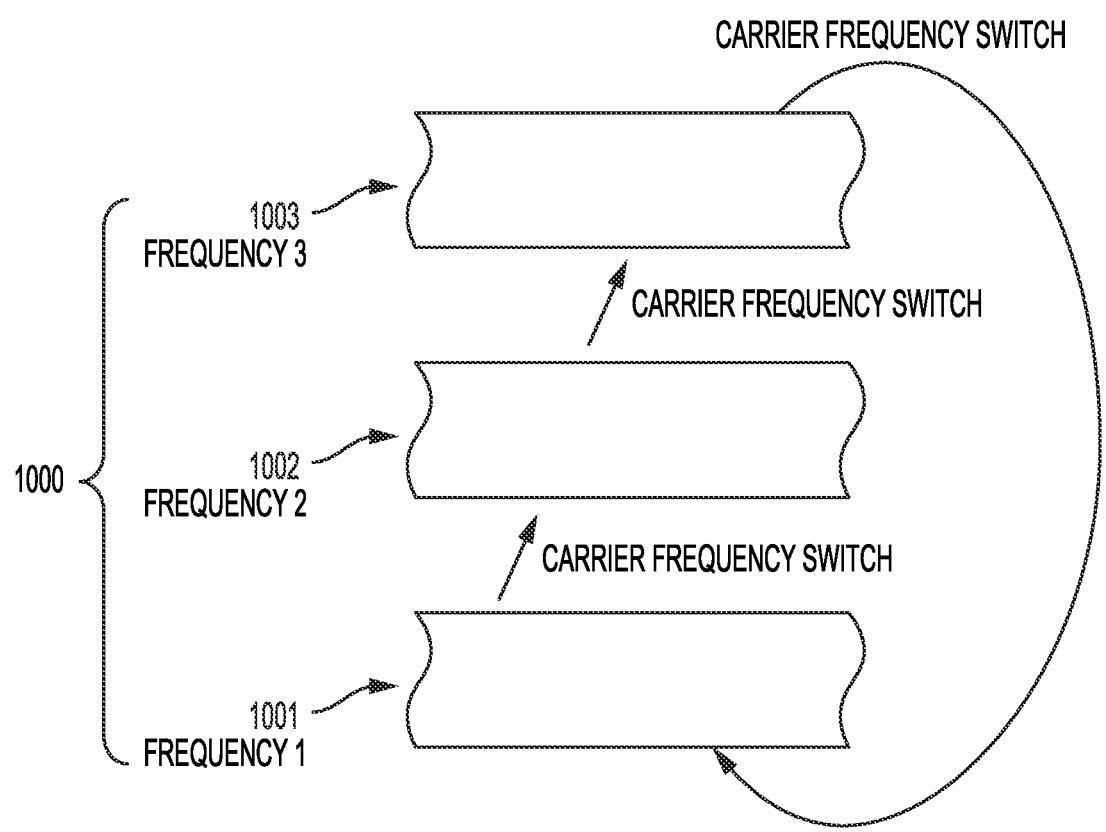
FIG. 10A illustrates an example of a sequence of carrier frequencies as may be utilized in opportunistic frequency switching according to aspects of the present disclosure.

Frequency diversity provided using opportunistic frequency switching of embodiments of the present disclosure utilizes a sequence of frequency transmission units (e.g., individual carrier frequencies or different BWPs within a system bandwidth) known to a transmitter device (e.g., a base station 105) and associated receiver device (e.g., a UE 115 in communication with the base station 105). For example, as shown in FIG. 10A, sequence of carrier frequencies 1000 as may be utilized by embodiments includes carrier frequencies 1001-1003. Carrier frequencies 1001, 1002, and/or 1003 of sequence of carrier frequencies 1000 may include adjacent carrier frequencies, carrier frequencies having the same channel spacing, carrier frequencies having different channel spacing, carrier frequencies of different radio frequency spectrum bands, etc. The particular configuration of the carrier frequencies and the number of carrier frequencies of a sequence of carrier frequencies may be determined based upon the availability of spectrum, the capabilities of the transmitter and receiver devices, the particular wireless channels for which the carrier frequencies are to be used, etc. Accordingly, the number of carrier frequencies and/or their frequencies and bandwidths may differ than that of examples shown herein. With regard to the number of carrier frequencies included in a sequence of carrier frequencies, it should be appreciated that there is generally a tradeoff between power consumption and how many frequencies a device monitors. Accordingly, if the medium is congested more carrier frequencies may be utilized at the expense of power consumption. If the medium is not congested, then embodiments may utilized fewer carrier frequencies (e.g., two carrier frequencies). Regardless of the particular configuration of the carrier frequencies and the number of carrier frequencies used, both a transmitter device (e.g., a base station 105) and associated receiver device (e.g., a UE 115 in communication with the base station 105) are provided with knowledge of the sequence of carrier frequencies (e.g., the number of carrier frequencies used, the frequency and bandwidth of the carrier frequencies, the sequence serial order of the carrier frequencies, etc.).

In operation of an opportunistic frequency switching procedure implemented according to embodiments, the carrier frequencies are utilized sequentially (i.e., in sequence serial order) with respect to a wireless channel (e.g., PDCCH, PDSCH, PUCCH, PUSCH, etc.) between the transmitter and receiver devices. For example, as shown in FIG. 10A, switching between carrier frequencies 1001-1003 of sequence of carrier frequencies 1000 is performed sequentially in a predefined sequence serial order. That is, when carrier frequency switching is initiated from carrier frequency 1001 the carrier frequency is switched to carrier frequency 1002, when carrier frequency switching is initiated from carrier frequency 1002 the carrier frequency is switched to carrier frequency 1003, when carrier frequency switching is initiated from carrier frequency 1003 the carrier frequency is switched to carrier frequency 1001, and so on. It should be appreciated that the carrier frequencies in a particular sequence serial order need not be a next frequency band of the carrier frequencies making up the sequence of carrier frequencies, but may instead utilize any order of carrier frequency bands. However, regardless of the particular relationship of the carrier frequency bands used, both a transmitter device (e.g., a base station 105) and associated receiver device (e.g., a UE 115 in communication with the base station 105) are provided with knowledge of the sequence serial order of the carrier frequencies.

Although a sequence serial order for switching between the carrier frequencies of a sequence of carrier frequencies may be predefined, opportunistic frequency switching according to embodiments nevertheless does not use a predefined or predetermined schedule for switching carrier frequencies of the sequence of carrier frequencies. Instead, embodiments implement ad hoc carrier frequency switching, such as to switch between carrier frequencies from time to time as may be determined by various factors. For example, a current carrier frequency of a sequence of carrier frequencies may be continued to be used for such time as substantial interference, an outage, etc. (collectively referred to as an event) is not sensed with respect to that carrier frequency. Carrier frequency switching to a next carrier frequency of the sequence of carrier frequencies may be implemented, however, when an event is sensed with respect to the current carrier frequency. Accordingly, embodiments of the present disclosure may provide event-based carrier frequency switching in an opportunistic frequency switching implementation.

Figure 10B:
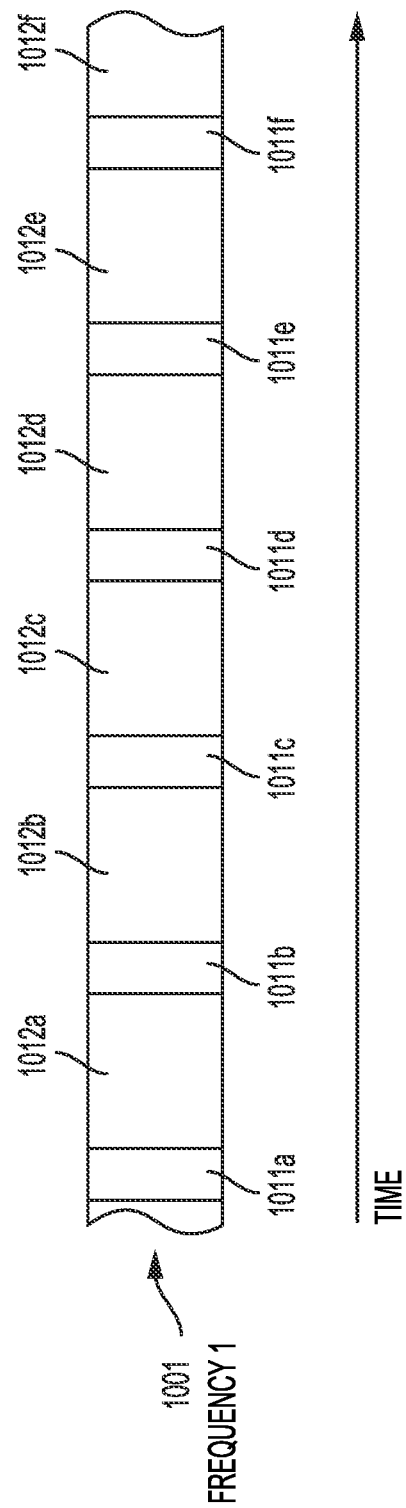
FIG. 10B illustrates an example of a sequence of medium sensing occasions of a carrier frequency utilized in opportunistic frequency switching according to aspects of the present disclosure.

Opportunistic frequency switching in accordance with concepts of the present disclosure may utilize medium sensing occasions with respect to the carrier frequencies of a sequence of carrier frequencies to detect events (e.g., interference, outages, etc.), such as may be used for event-based carrier frequency switching. For example, as shown in FIG. 10B, a sequence of medium sensing occasions for carrier frequency 1001 of sequence of carrier frequencies 1000 may be defined in time, such as may be configured for inter-unit delay minimization according to embodiments of the present disclosure. In particular, the sequence of medium sensing occasions for carrier frequency 1001 as shown in FIG. 10B include medium sensing occasions 1011a-1011f having corresponding channel occupancy times (COTs) 1012a-1012f disposed therebetween. The medium sensing occasions of a sequence of carrier frequencies may be periodic, such as to define COTs of equal sizes. Alternatively, the medium sensing occasions of a sequence of carrier frequencies may be aperiodic. In operation according to embodiments, however, there is synchronization between a transmitter device (e.g., a base station 105) and associated receiver device (e.g., a UE 115 in communication with the base station 105) with respect to the timing of the medium sensing occasions of the sequence of carrier frequencies for each carrier frequency of the sequence of carrier frequencies. Accordingly, both a transmitter device (e.g., a base station 105) and associated receiver device (e.g., a UE 115 in communication with the base station 105) are provided with knowledge of the sequence of medium sensing occasions for carrier frequencies of a sequence of carrier frequencies.

Medium sensing occasions (e.g., medium sensing occasions 1011a-1011f) of embodiments of the disclosure provide periods in which a transmitter device may monitor the respective carrier frequency for determining if an event (e.g., interference, outage, etc.) is detected. Accordingly, the transmitter device of embodiments does not provide transmission of a signal to a corresponding receiver device using the respective carrier frequency during a medium sensing occasion instance. The COTs (e.g., COTs 1012a-10120 of embodiments of the disclosure, however, provide periods in which the transmitter device may provide transmission of a signal (e.g., comprising the components of a particular channel, such as PDCCH, PDSCH, PUCCH, PUSCH, etc.) to the corresponding receiver device using the respective carrier frequency. In accordance with embodiments of the present disclosure, the period of medium sensing occasion instances is significantly less than the period of COT instances for a respective carrier frequency, such as to facilitate spectrum efficiency.

In operation according to embodiments of an opportunistic frequency switching procedure in accordance with concepts of the present disclosure, the carrier frequency switching implemented according to embodiments of the present disclosure may be based in part on the sequence of medium sensing occasions for a carrier frequency. For example, a transmitter device (e.g., a base station 105) may monitor a carrier frequency during a medium sensing occasion of the respective schedule of medium sensing occasions for determining if an event (e.g., interference, outage, etc.) is detected. If no event is detected in the medium sensing occasion, the transmitter device may transmit a signal to one or more receiver devices (e.g., a UE 115 in communication with base station 105) via the carrier frequency during the COT following the medium sensing occasion. Such monitoring during medium sensing occasions and transmitting during COTs may continue with respect to a current carrier frequency of the sequence of carrier frequencies until, for example, such time as an event is detected in a medium sensing occasion or the transmitter device otherwise determines that a carrier frequency switch is warranted (e.g., a signal is not received from a receiver device in a channel scheduled by the signal transmission from the transmitter device, indicating interference or blockage of the transmission on the current carrier frequency of the sequence of carrier frequencies). If an event is detected in the medium sensing occasion, the transmitter device may initiate a carrier frequency switch to a next carrier frequency of the sequence of carrier frequencies and proceed to monitor that carrier frequency during a medium sensing occasion of the respective schedule of medium sensing occasions for determining if an event is detected. Thus, depending upon whether an event is detected in a medium sensing occasion of a carrier frequency, the transmitter device may transmit a signal during a following COT or initiate a switch to a next carrier frequency, and so on through the carrier frequencies of the sequence of carrier frequencies.

A receiver device may also initiate carrier frequency switching based in part on the sequence of medium sensing occasions for a carrier frequency, although operating separately from transmitter device initiated carrier frequency switching. For example, a receiver device (e.g., a UE 115) may monitor a carrier frequency during a period (e.g., COT) following a medium sensing occasion of the respective schedule of medium sensing occasions for determining if a decodable signal (e.g., preamble, channel state information reference signal (CSI-RS), demodulation reference signal (DMRS), downlink control information (DCI), etc.) from an associated transmitter device (e.g., a base station 105 in communication with the UE 115) is detected. If a decodable signal is detected in a period following the medium sensing occasion, the receiver device may decode and utilize the signal transmitted by the transmitter device via the carrier frequency. Such monitoring during periods (COTs) following the medium sensing occasions and decoding the signals may continue with respect to a current carrier frequency of the sequence of carrier frequencies until, for example, such time as a decodable signal is not detected. If a decodable signal is not detected in the period following a medium sensing occasion, the receiver device may initiate a carrier frequency switch to a next carrier frequency of the sequence of carrier frequencies and proceed to monitor that carrier frequency during a period following a medium sensing occasion of the respective schedule of medium sensing occasions for determining if a decodable signal is detected. Thus, depending upon whether a decodable signal is detected in a period following a medium sensing occasion of a carrier frequency, the receiver device may decode and utilize a signal or initiate a switch to a next carrier frequency, and so on through the carrier frequencies of the sequence of carrier frequencies.

Figure 10C:
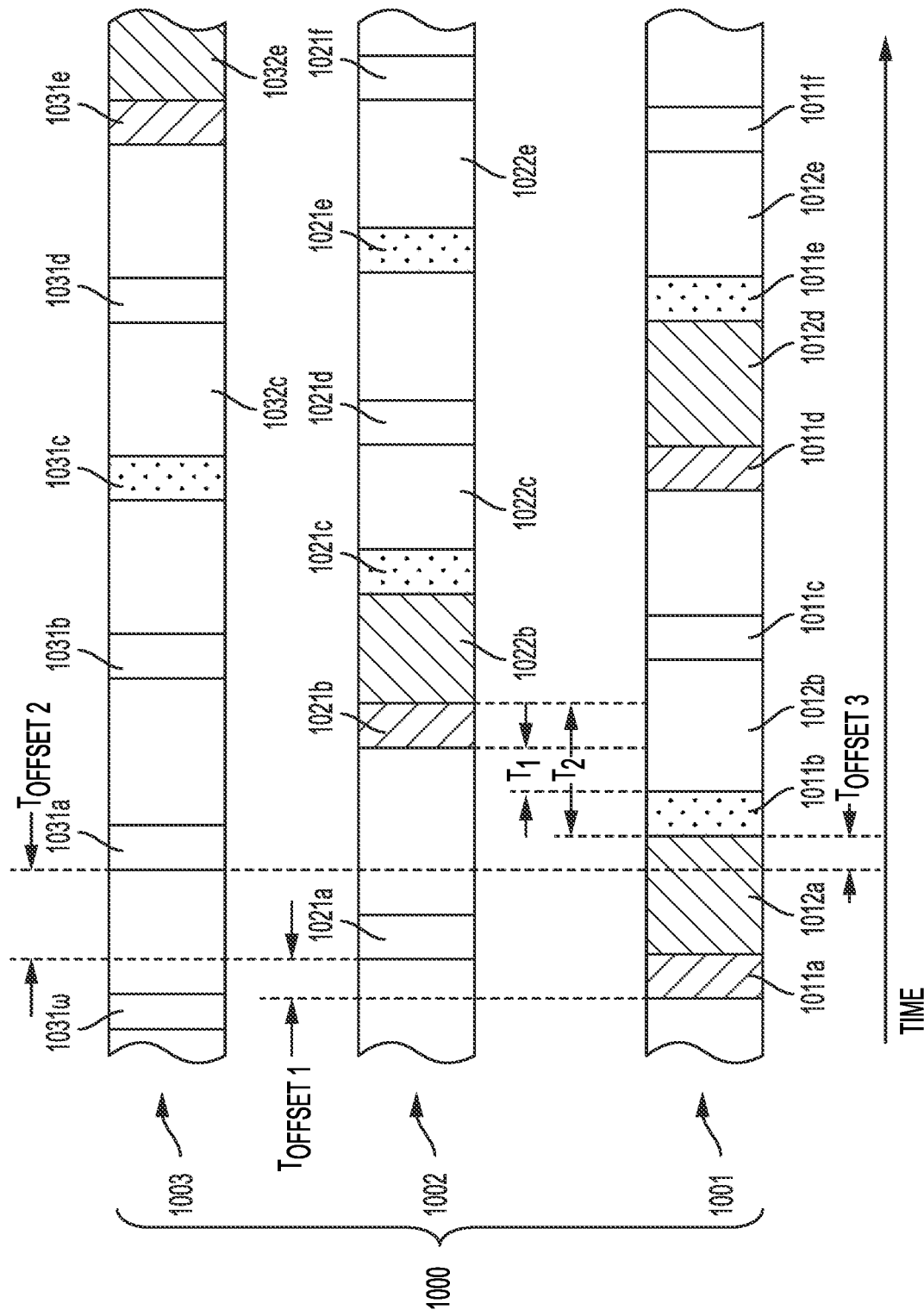
FIG. 10C illustrates an example of offset sequences of medium sensing occasions of the carrier frequencies of a sequence of carrier frequencies as may be utilized in opportunistic frequency switching according to aspects of the present disclosure.

Carrier frequency switching implemented by an opportunistic frequency switching procedure operable in accordance with the foregoing is illustrated in FIG. 10C. In particular, the example of FIG. 10C illustrates that opportunistic frequency switching implemented according to embodiments does not need to initiate carrier frequency switching when single carrier frequency communications is reliable (e.g., there is no outage or little interference).

As shown in FIG. 10C, carrier frequencies 1001-1003 of sequence of carrier frequencies 1000 each have a respective sequence of medium sensing occasions (i.e., sequence of medium sensing occasions 1011a-1011f for carrier frequency 1001, sequence of medium sensing occasions 1021a-1021f for carrier frequency 1002, and sequence of medium sensing occasions 1031w-1031e). In operation as described above, a transmitter device monitors a current carrier frequency during a next medium sensing occasion and determines if an event is detected, and depending upon whether an event is detected the transmitter device may transmit a signal during the following COT or initiate a switch to a next carrier frequency. Correspondingly, in operation as described above, a receiver device monitors a current carrier frequency during the period following a next medium sensing occasion and determines if a decodable signal from the transmitter device is detected, and depending upon whether a decodable signal is detected the receiver device may decode and utilize a signal or initiate a switch to a next carrier frequency. The foregoing opportunistic frequency switching operation is described in further detail below with reference to the particular example illustrated in FIG. 10C.

In the example illustrated in FIG. 10C, the transmitter device (e.g., a base station 105) monitors carrier frequency 1001 during medium sensing occasion 1011a for determining if an event (e.g., interference, outage, etc.) is detected. In the illustrated example, no event is detected in medium sensing occasion 1011a, and thus the transmitter device transmits a signal to one or more receiver devices (e.g., a UE 115 in communication with base station 105) via carrier frequency 1001 during COT 1012a following medium sensing occasion 1011a. In continuing operation of the transmitter device, the transmitter device again monitors carrier frequency 1001 albeit during subsequent medium sensing occasion 1011b for determining if an event is detected. In the illustrated example, an event is detected in medium sensing occasion 1011b, and thus the transmitter device initiates a carrier frequency switch to carrier frequency 1002 (i.e., a next carrier frequency of the sequence of carrier frequencies sequence serial order) and proceeds to monitor that carrier frequency during medium sensing occasion 1021b for determining if an event is detected. In the illustrated example, no event is detected in medium sensing occasion 1021b, and thus the transmitter device transmits a signal to one or more receiver devices via carrier frequency 1002 during COT 1022b following medium sensing occasion 1021b. In continuing operation of the transmitter device, the transmitter device again monitors carrier frequency 1002 albeit during subsequent medium sensing occasion 1021c for determining if an event is detected. In the illustrated example, an event is detected in medium sensing occasion 1021c, and thus the transmitter device initiates a carrier frequency switch to carrier frequency 1003 (i.e., a next carrier frequency of the sequence of carrier frequencies sequence serial order) and proceeds to monitor that carrier frequency during medium sensing occasion 1031c for determining if an event is detected. In the illustrated example, an event is detected in medium sensing occasion 1031c, and thus the transmitter device initiates a carrier frequency switch to carrier frequency 1001 (i.e., a next carrier frequency of the sequence of carrier frequencies sequence serial order in light of there being no further carrier frequencies in the carrier frequency sequence) and proceeds to monitor that carrier frequency during medium sensing occasion 1011d for determining if an event is detected. In the illustrated example, no event is detected in medium sensing occasion 1011d, and thus the transmitter device transmits a signal to one or more receiver devices via carrier frequency 1001 during COT 1012d following medium sensing occasion 1011d. In continuing operation of the transmitter device, the transmitter device again monitors carrier frequency 1001 albeit during subsequent medium sensing occasion 1011e for determining if an event is detected. In the illustrated example, an event is detected in medium sensing occasion 1011e, and thus the transmitter device initiates a carrier frequency switch to carrier frequency 1002 and proceeds to monitor that carrier frequency during medium sensing occasion 1021e for determining if an event is detected. In the illustrated example, an event is detected in medium sensing occasion 1021e, and thus the transmitter device initiates a carrier frequency switch to carrier frequency 1003 and proceeds to monitor that carrier frequency during medium sensing occasion 1031e for determining if an event is detected. In the illustrated example, no event is detected in medium sensing occasion 1031e, and thus the transmitter device transmits a signal to one or more receiver devices via carrier frequency 1003 during COT 1032e following medium sensing occasion 1031e.

It can be seen from the foregoing that, in accordance with the exemplary opportunistic frequency switching procedure, the transmitter device may implement unscheduled carrier frequency switching based in part on the sequence of medium sensing occasions for a carrier frequency. Thus, depending upon whether an event is detected in a medium sensing occasion of a carrier frequency, the transmitter device may transmit a signal during a following COT or initiate a switch to a next carrier frequency. It should be appreciated that, although the foregoing example describes unscheduled carrier frequency switching in association with detection of events during medium sensing occasions, embodiments may additionally or alternatively implement event-based carrier frequency switching in an opportunistic frequency switching procedure based upon other occurrences or non-occurrences indicating that a carrier frequency switch is warranted in accordance with concepts of the present disclosure. For example, although the transmitter device may not detect an event (e.g., interference, outage, etc.) during a medium sensing occasion, signal transmission in the following COT may nevertheless be substantially interfered such that the receiver device may fail to detect a decodable signal from the transmitter device. Accordingly, embodiments of an opportunistic frequency switching procedure may initiate a carrier frequency switch based on an indication that an event occurred with respect to a signal transmission in a COT (e.g., a signal is not received from a receiver device in a channel scheduled by the signal transmission from the transmitter device, indicating interference or blockage of the transmission on the current carrier frequency of the sequence of carrier frequencies).

Referring again to the example illustrated in FIG. 10C, the receiver device (e.g., a UE 115) monitors carrier frequency

1001 during COT 1012*a* following medium sensing occasion 1011*a* for determining if a decodable signal (e.g., preamble, CSI-RS, DMRS, DCI, etc.) from the transmitter device is detected. In the illustrated example, a decodable signal is detected in COT 1012*a*, (e.g., the transmitter device did not detect an event in medium sensing occasion 1011*a* and transmitted a signal in COT 1012*a*) and thus the receiver device decodes and utilizes the signal transmitted by the transmitter device via carrier frequency 1001. In continuing operation of the receiver device, the receiver device again monitors carrier frequency 1001 albeit during subsequent COT 1012*b* for determining if a decodable signal from the transmitter is detected. In the illustrated example, a decodable signal is not detected in COT 1012*b* (e.g., the transmitter device detected an event in medium sensing occasion 1011*b* and initiated a carrier frequency switch), and thus the receiver device initiates a carrier frequency switch to carrier frequency 1002 and proceeds to monitor that carrier frequency during COT 1022*b* for determining if a decodable signal from the transmitter device is detected. In the illustrated example, a decodable signal is detected in COT 1022*b* (e.g., the transmitter device did not detect an event in medium sensing occasion 1021*b* and transmitted a signal in COT 1022*b*), and thus the receiver device decodes and utilizes the signal transmitted by the transmitter device via carrier frequency 1002. In continuing operation of the receiver device, the receiver device again monitors carrier frequency 1002 albeit during subsequent COT 1022*c* for determining if a decodable signal from the transmitter is detected. In the illustrated example, a decodable signal is not detected in COT 1022*c* (e.g., the transmitter device detected an event in medium sensing occasion 1021*c* and initiated a carrier frequency switch), and thus the receiver device initiates a carrier frequency switch to carrier frequency 1003 and proceeds to monitor that carrier frequency during COT 1032*c* for determining if a decodable signal from the transmitter device is detected. In the illustrated example, a decodable signal is not detected in COT 1032*c* (e.g., the transmitter device detected an event in medium sensing occasion 1031*c* and initiated a carrier frequency switch), and thus the receiver device initiates a carrier frequency switch to carrier frequency 1001 and proceeds to monitor that carrier frequency during COT 1012*d* for determining if a decodable signal from the transmitter device is detected. In the illustrated example, a decodable signal is detected in COT 1012*d*, (e.g., the transmitter device did not detect an event in medium sensing occasion 1011*d* and transmitted a signal in COT 1012*d*) and thus the receiver device decodes and utilizes the signal transmitted by the transmitter device via carrier frequency 1001. In continuing operation of the receiver device, the receiver device again monitors carrier frequency 1001 albeit during subsequent COT 1012*e* for determining if a decodable signal from the transmitter is detected. In the illustrated example, a decodable signal is not detected in COT 1012*e* (e.g., the transmitter device detected an event in medium sensing occasion 1011*e* and initiated a carrier frequency switch), and thus the receiver device initiates a carrier frequency switch to carrier frequency 1002 and proceeds to monitor that carrier frequency during COT 1022*e* for determining if a decodable signal from the transmitter device is detected. In the illustrated example, a decodable signal is not detected in COT 1022*e* (e.g., the transmitter device detected an event in medium sensing occasion 1021*e* and initiated a carrier frequency switch), and thus the receiver device initiates a carrier frequency switch to carrier frequency 1003 and proceeds to monitor that carrier frequency during COT 1032*e* for determining if a decodable signal from the transmitter device is detected. In the illustrated example, a decodable signal is detected in COT 1032*e*, (e.g., the transmitter device did not detect an event in medium sensing occasion 1031*e* and transmitted a signal in COT 1032*e*) and thus the receiver device decodes and utilizes the signal transmitted by the transmitter device via carrier frequency 1003.

It can be seen from the foregoing that, in accordance with the exemplary opportunistic frequency switching procedure, the receiver device may implement carrier frequency switching based in part on the sequence of medium sensing occasions for a carrier frequency. Thus, depending upon whether a decodable signal is detected in a period (e.g., COT) following a medium sensing occasion of a carrier frequency, the receiver device may decode and utilize a signal or initiate a switch to a next carrier frequency. It should be appreciated that, although the transmitter device may not detect an event in a medium sensing occasion and thus provide signal transmission in a following COT, the signal transmission may nevertheless be interfered such that the receiver device may not detect a decodable signal from the transmitter device. In such instances, the receiver device may initiate a carrier frequency switch as shown in the above example. Accordingly, it can be seen that although carrier frequency switching implemented by both the transmitter device and the receiver device may be based in part on the sequence of medium sensing occasions, each such device implements the carrier frequency switching separately. Although this separate implementation of carrier frequency switching by the transmitter device and receiver device may result in out-of-sync carrier frequency switches in some situations (e.g., interference or outage during a COT, but not during a preceding medium sensing occasion), operation of an opportunistic frequency switching procedure of embodiments is self-correcting. For example, the transmitter device may detect a failure of the receiver device to act in accordance with data of the signal transmission of an interfered COT and, knowing the sequence of carrier frequencies, initiate a carrier frequency switch to synchronize opportunistic frequency switching with the receiver device.

Initiating a carrier frequency switch by the circuitry of a communication device, such as the transmitter device and/or receiver device implementing an opportunistic frequency switching procedure of embodiments of the disclosure, involves some amount of time. For example, the local oscillator (LO) and associated tuner circuitry of the transmitter device may utilize a tuning time ($T_{tune1}$) reach steady state after a frequency switch. Likewise, the LO and associated tuner circuitry of the receiver device may utilize a tuning time ($T_{tune2}$) reach steady state after a frequency switch, wherein $T_{tune1}$ and $T_{tune2}$ may be the same or different periods of time. Accordingly, the sequence of medium sensing occasions for each carrier frequency of the sequence of carrier frequencies of embodiments herein may include an offset with respect to the sequence of medium sensing occasions of a next carrier frequency of the sequence of carrier frequencies.

In the example of FIG. 10C, offset time ($T_{offset1}$) is provided with respect to sequence of medium sensing occasions 1011*a*-1011*f* of carrier frequency 1001 and sequence of medium sensing occasions 1021*a*-1021*f* of carrier frequency 1002. Similarly, in the example of FIG. 10C, offset time ($T_{offset2}$) is provided with respect to sequence of medium sensing occasions 1021*a*-1021*f* of carrier frequency 1002 and sequence of medium sensing occasions 1031*w*-1021*e* of carrier frequency 1003. Further, in the example of FIG. 10C, offset time ($T_{offset3}$) is provided with respect to sequence of medium sensing occasions 1031w-1031e of carrier frequency 1003 and sequence of medium sensing occasions 1011a-1011f of carrier frequency 1001. $T_{offset1}$, $T_{offset2}$, and/or $T_{offset3}$ may be the same or different periods of time. It should be appreciated, however, that the use of such offset times may nevertheless be compliant with existing rules for FBE and ETSI. For example, ETSI EN 301 893 for FBE requires that the periodicity of the frame structure may be changed only every so often (e.g., 200 ms). The offset structure of the sequences of medium sensing occasions of embodiments herein provides a frame structure that may be implemented in compliance with such rules, and may even be optimized for FBE access rules. Accordingly, an opportunistic frequency switching procedure in accordance with concepts herein may readily be deployed in 5 GHz in compliance with existing standards.

Each of $T_{offset1}$, $T_{offset2}$, and/or $T_{offset3}$ of embodiments of the present disclosure is configured to provide a time period sufficient to accommodate operation of circuitry of the transmitter device and/or receiver device in implementing a frequency switch. For example, $T_{offset1}$ provided with respect to sequence of medium sensing occasions 1011a-1011f of carrier frequency 1001 and sequence of medium sensing occasions 1021a-1021f of carrier frequency 1002 may be configured to provide a time period (shown as $T_1$) between the end of a medium sensing occasion of carrier frequency 1001 and the beginning of a next occurring medium sensing occasion of carrier frequency 1002 that is at least as long as the tuning time of the transmitter device (i.e., $T_1 \geq T_{tune1}$). Additionally or alternatively, $T_{offset1}$ provided with respect to sequence of medium sensing occasions 1011a-1011f of carrier frequency 1001 and sequence of medium sensing occasions 1021a-1021f of carrier frequency 1002 may be configured to provide a time period (shown as $T_2$) between the end of a COT of carrier frequency 1001 and the beginning of a next occurring COT of carrier frequency 1002 that is at least as long as the tuning time of the receiver device (i.e., $T_2 \geq T_{tune2}$). Accordingly, the offset provided by $T_{offset1}$ of embodiments may implement a tuning guard period with respect to the transmitter device and/or receiver device. $T_{offset2}$ and $T_{offset3}$ may be similarly configured tuning guard period with respect to the transmitter device and/or receiver device.

It can be seen from the foregoing that the sequence of medium sensing occasions for each carrier frequency of the sequence of carrier frequencies of embodiments herein may include an offset with respect to the sequence of medium sensing occasions of a next carrier frequency of the sequence of carrier frequencies configured to accommodate frequency tuning by the transmitter device and/or receiver device. Accordingly, the carrier frequency switching of an opportunistic frequency switching procedure implemented according to embodiments of the present disclosure may be based in part on offset sequences of medium sensing occasions for the carrier frequencies.

Figure 11A:
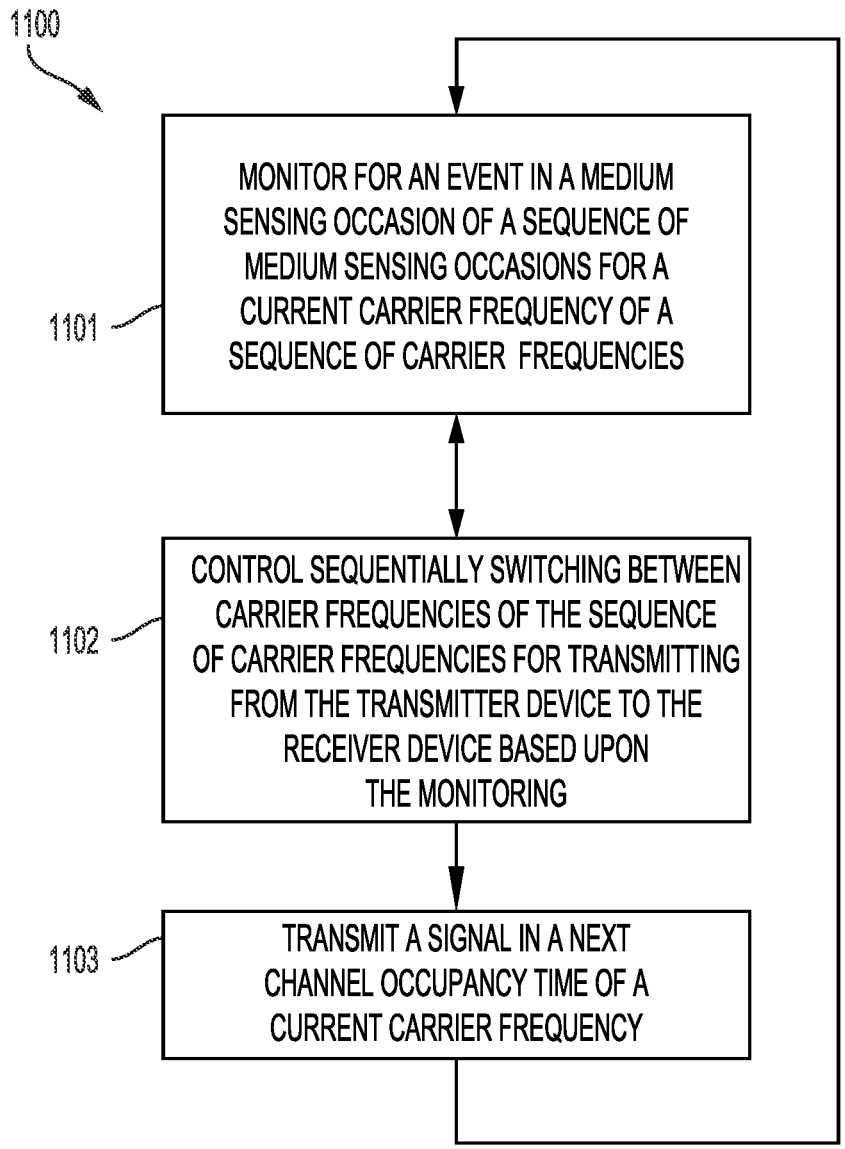
FIGS. 11A and 11B are flow diagrams illustrating operation of a transmitter device implementing opportunistic frequency switching according to aspects of the present disclosure.
Figure 11B:
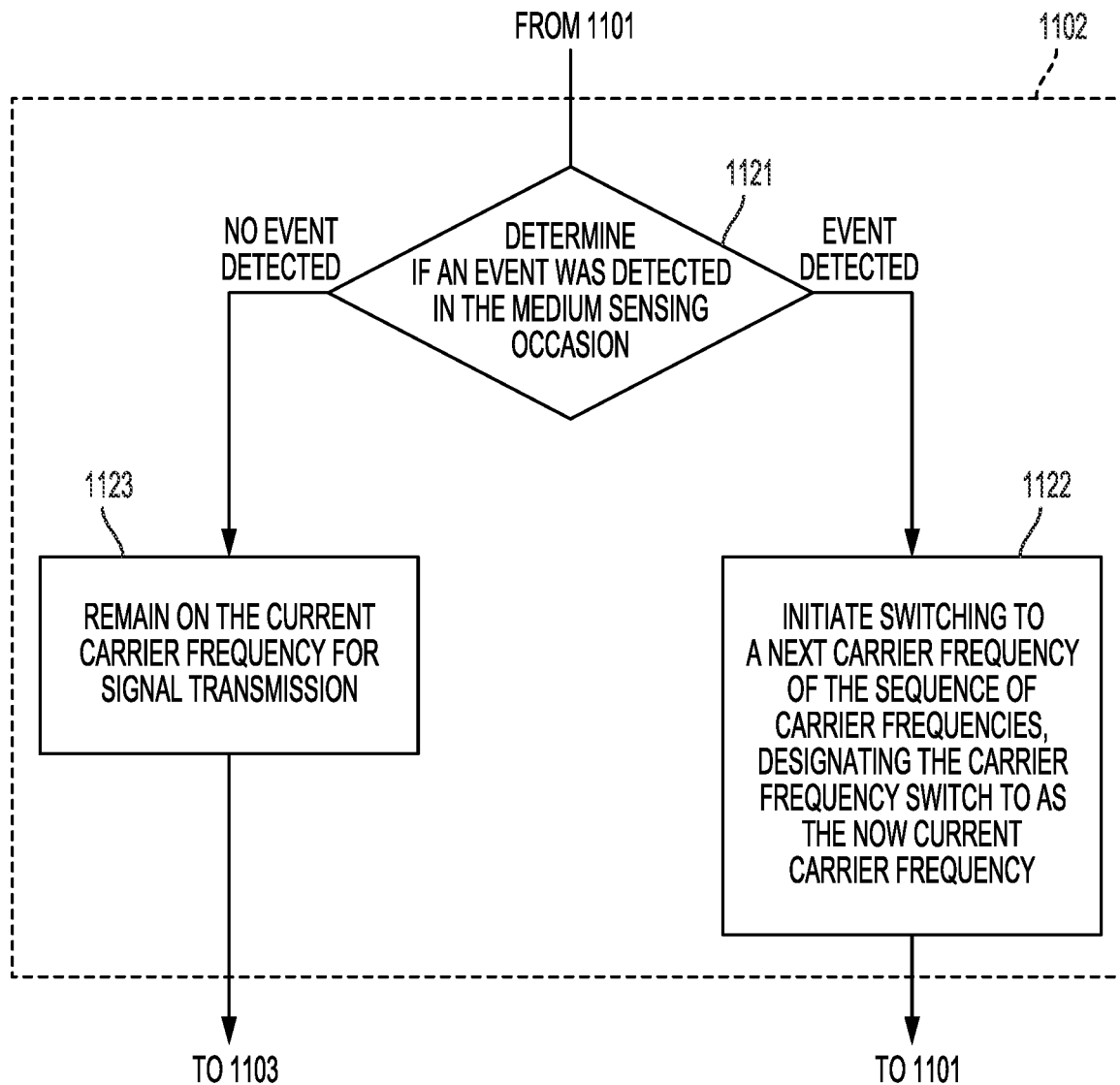

FIGS. 11A and 11B show a flow diagram providing operation of a transmitter device performing an opportunistic frequency switching procedure in accordance with the concepts described herein. In particular, flow 1100 of FIG. 11A shows operation of the transmitter device implementing an opportunistic frequency switching procedure and FIG. 11B shows detail with respect to operation to control sequentially switching between carrier frequencies (e.g., block 1102 of FIG. 11A) by the transmitter device of embodiments of the present disclosure. Controller/processor 240, receiver processor 238, and/or transmit processor 220 of an instance of base station 105 operating as a transmitter device in an opportunistic frequency switching procedure of embodiments may, for example, perform or direct the execution of the functional blocks of FIGS. 11A and 11B.

Referring to FIG. 11A, at block 1101 of flow 1100 of the illustrated embodiment the transmitter device monitors for an event in a medium sensing occasion of a sequence of medium sensing occasions for a current carrier frequency of a sequence of carrier frequencies. The transmitter device may, for example, be provisioned with a sequence of carrier frequencies to be utilized for one or more wireless channels (e.g., PDCCH, PDSCH, PUCCH, PUSCH, etc.) for implementing opportunistic frequency switching providing frequency diversity to avoid or mitigate medium access issues. For example, information regarding a plurality of carrier frequencies (e.g., their frequencies and bandwidths) and information regarding a sequential serial order for their use (e.g., a carrier frequency switching order, a primary or default carrier frequency for initiating opportunistic frequency switching and/or for returning to in self-correction operation) may be provided to and/or determined by the transmitter device. The transmitter device may additionally be provisioned with a different sequence of medium sensing occasions for each carrier frequency of the sequence of carrier frequencies. For example, a beginning of each medium sensing occasion of the sequence of medium sensing occasions for a carrier frequency of the sequence of carrier frequencies may be offset from a beginning of each respective medium sensing occasion of the sequence of medium sensing occasions for another carrier frequency of the sequence of carrier frequencies by at least a tuning guard period. The transmitter device may utilize such provisioned information to determine an instance of a next medium sensing occasion of a current carrier frequency and to monitor that medium sensing occasion.

At block 1102 of flow 1100 illustrated in FIG. 11A, the transmitter device controls sequentially switching between carrier frequencies of the sequence of carrier frequencies for transmitting from the transmitter device to a receiver device based upon the monitoring. For example, as explained in further detail with reference to FIG. 11B below, the transmitter device of embodiments transmits a signal during a COT following a monitored medium sensing occasion or initiates a switch to a next carrier frequency of the sequence of carrier frequencies depending upon whether an event is detected in a medium sensing occasion of a carrier frequency.

In operation for controlling sequentially switching between carrier frequencies of the sequence of carrier frequencies the transmitter device of the embodiment illustrated in FIG. 11B determines, at block 1121, if an event was detected in the medium sensing occasion that was monitored. For example, the transmitter device may determine if substantial interference (e.g., interference sufficient to block or impede the ability of a receiver device to decode a signal transmitted by the transmitter device) or an outage (e.g., the carrier frequency is occupied) is detected in the medium sensing occasion.

If an event was detected by the transmitter device during the medium sensing occasion, processing according to the embodiment illustrated in FIG. 11B proceeds to block 1122 to initiate carrier frequency switching. For example, the transmitter device may switch to a next carrier frequency of the sequence of carrier frequencies, whereby the carrier frequency switched to now becomes the current carrier frequency for monitoring of a medium sensing occasion for an event. Accordingly, processing according to the embodiment illustrated in FIG. 11B proceeds from block 1122 to block 1101 (FIG. 11A) to again monitor for an event in a medium sensing occasion of the now current carrier frequency (i.e., the carrier frequency that was switched to by the transmitter device).

If, however, no event was detected by the transmitter device during the medium sensing occasion, processing according to the embodiment illustrated in FIG. 11B proceeds to block 1123 for signal transmission by the transmitter device. For example, the transmitter device may remain on the current carrier frequency (e.g., single carrier frequency communications is reliable), without switching to a next carrier frequency of the sequence of carrier frequencies, to enable signal transmission on the current carrier frequency at block 1103 (FIG. 11A).

Referring again to FIG. 11A, at block 1103 of the illustrated embodiment the transmitter device transmits a signal to one or more receiver devices via the current carrier frequency in a COT following the medium sensing occasion that was monitored and determined not to have an event detected therein. Processing according to flow 1100 illustrated in FIG. 11A then proceeds to block 1101 to monitor for an event in a subsequent medium sensing occasion of the current carrier frequency and to control sequentially switching between carrier frequencies according to the opportunistic frequency switching procedure of the illustrated embodiment.

Figure 12A:
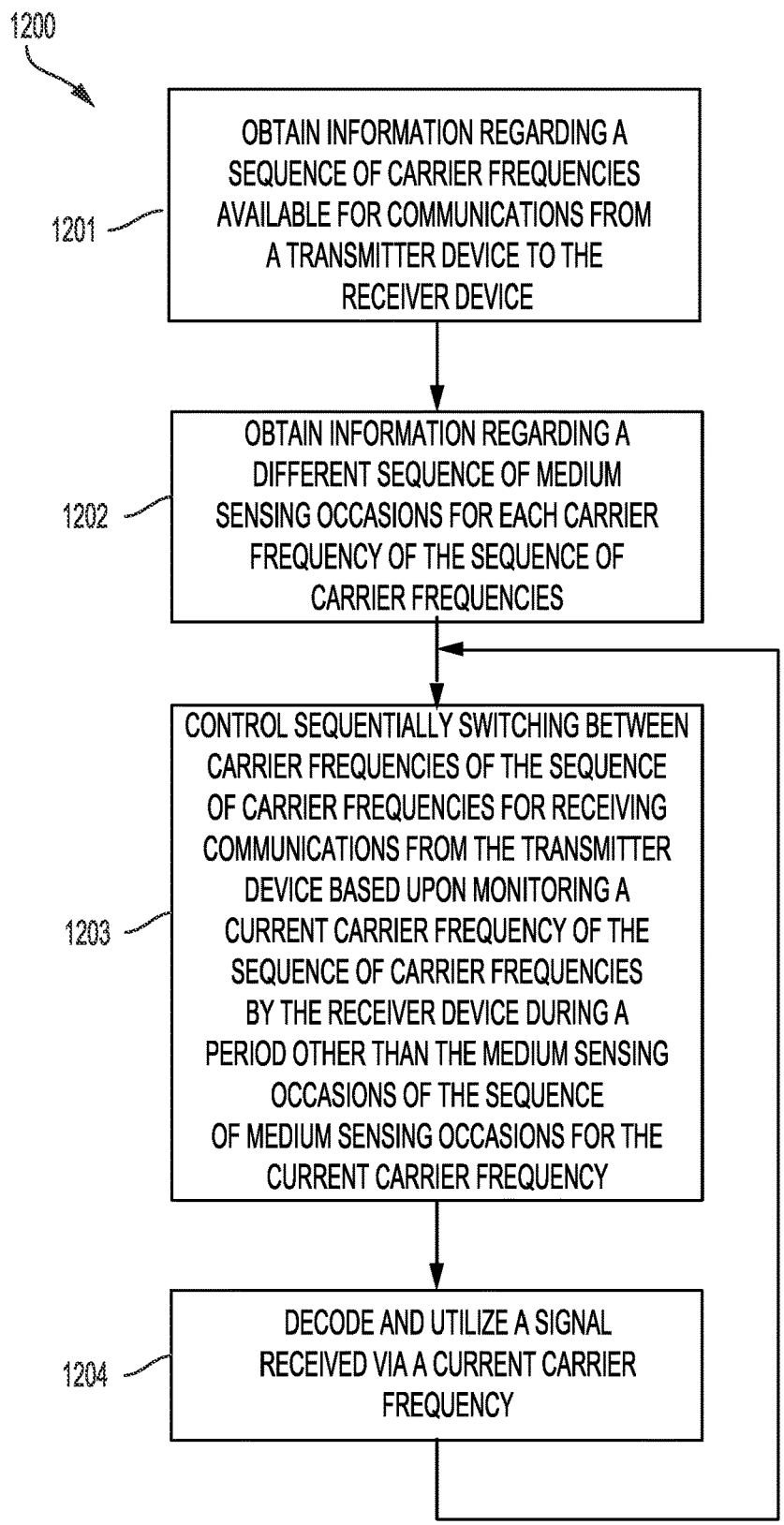
FIGS. 12A and 12B are flow diagrams illustrating operation of a receiver device implementing opportunistic frequency switching according to aspects of the present disclosure.
Figure 12B:
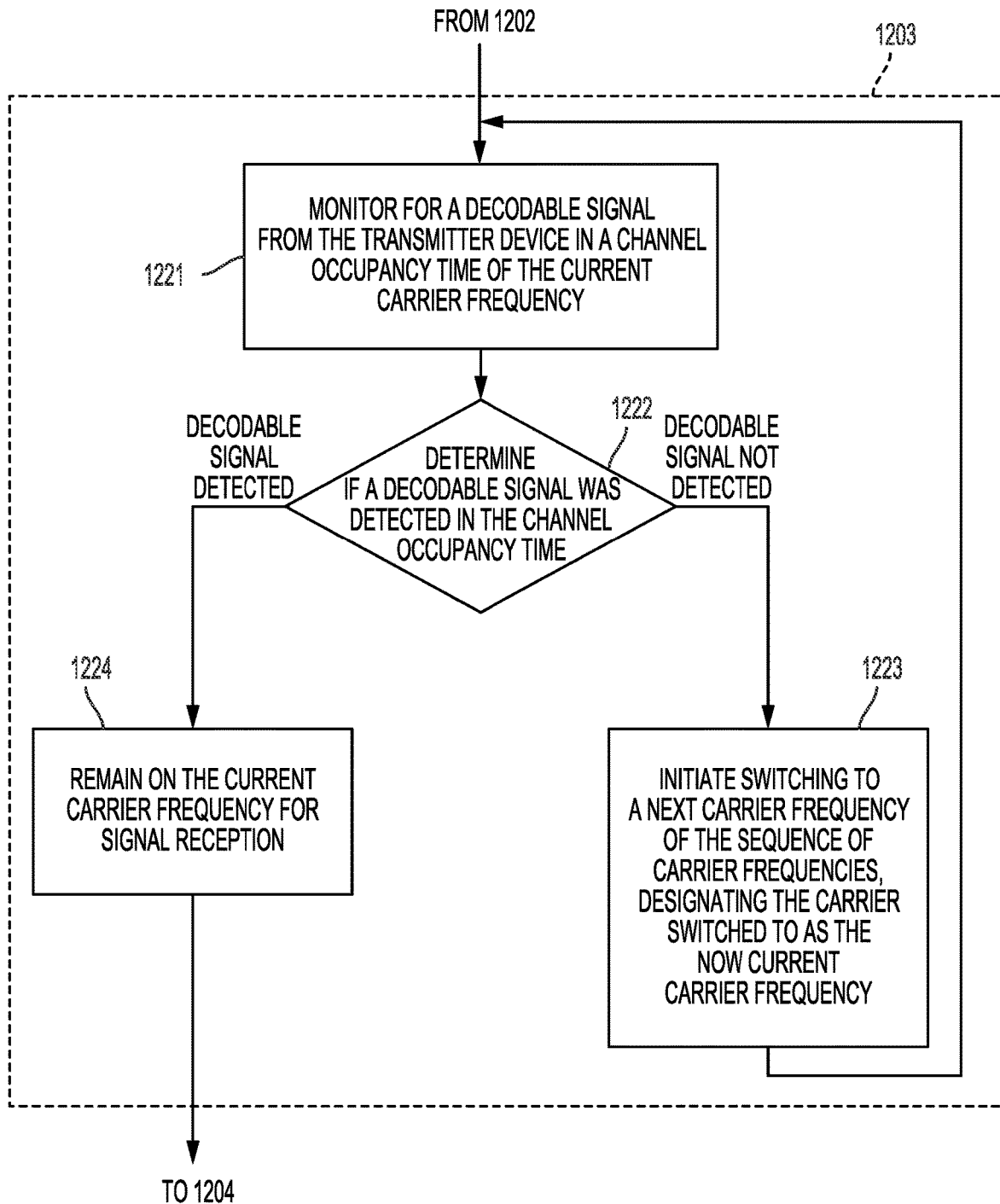

FIGS. 12A and 12B show a flow diagram providing operation of a receiver device performing an opportunistic frequency switching procedure in accordance with the concepts described herein. In particular, flow 1200 of FIG. 12A shows operation of the receiver device implementing an opportunistic frequency switching procedure and FIG. 12B shows detail with respect to operation to control sequentially switching between carrier frequencies (e.g., block 1203 of FIG. 12A) by the receiver device of embodiments of the present disclosure. Controller/processor 280, receiver processor 258, and/or transmit processor 264 of an instance of UE 115 operating as a receiver device in an opportunistic frequency switching procedure of embodiments may, for example, perform or direct the execution of the functional blocks of FIGS. 12A and 12B.

Referring to FIG. 12A, at blocks 1201 and 1202 of flow 1200 of the illustrated embodiment the receiver device obtains information regarding a sequence of carrier frequencies available for communication from a transmitter device to the receiver device and obtains information regarding a different sequence of medium sensing occasions for each carrier frequency of the sequence of carrier frequencies. The information regarding the sequence of carrier frequencies may, for example, comprise a plurality of carrier frequencies (e.g., their frequencies and bandwidths) and information regarding a sequential serial order for their use (e.g., a carrier frequency switching order, a primary or default carrier frequency for initiating opportunistic frequency switching and/or for returning to in self-correction operation) for one or more wireless channels (e.g., PDCCH, PDSCH, PUCCH, PUSCH, etc.) for implementing opportunistic frequency switching providing frequency diversity to avoid or mitigate medium access issues. The information regarding the different sequence of medium sensing occasions for each carrier frequency of the sequence of carrier frequencies may, for example, comprise information for a sequence of medium sensing occasions for a carrier frequency (e.g., a primary or default carrier frequency) of the sequence of carrier frequencies. The information regarding the different sequence of medium sensing occasions for each carrier frequency of the sequence of carrier frequencies may additionally include offset information for determining a beginning of each medium sensing occasion of the sequence of medium sensing occasions for other carrier frequencies of the sequence of carrier frequencies may be determined.

It should be appreciated that the information regarding the sequence of carrier frequencies and the information regarding the different sequences of medium sensing occasions for each carrier frequency may be obtained in a different order than that depicted in flow 1200 by blocks 1201 and 1202. For example, the receiver device may obtain the foregoing information from a transmitter device as part of a cell search, registration, and camping procedure. In operation of such a cell search, registration, and camping procedure, the receiving device may perform cell selection procedure and, after detecting a synchronization signal block (SSB), the receiver device may acquire corresponding system information (SI). The SI on each carrier frequency may point to another or multiple other "linked" carrier frequencies (e.g., sequence of carrier frequencies) utilized for opportunistic frequency switching according to concepts herein. The SI may additionally contain sensing occasion information for each of the linked carrier frequencies. The receiver device may register with the system utilizing the group of linked carrier frequencies for random access procedure and data exchange. In operation according to embodiments, measurements for the camping procedures may take into account medium sensing occasions for each carrier frequency.

At block 1203 of flow 1200 illustrated in FIG. 12A, the receiver device controls sequentially switching between carrier frequencies of the sequence of carrier frequencies for receiving communications from the transmitter device based upon monitoring a current carrier frequency of the sequence of carrier frequencies by the receiver device during a period other than the medium sensing occasions of the sequence of medium sensing occasions for the current carrier frequency. For example, as explained in further detail with reference to FIG. 12B below, the receiver device of embodiments monitors for a decodable signal transmitted by the transmitter device during a COT following a medium sensing occasion and initiates a switch to a next carrier frequency of the sequence of carrier frequencies depending upon whether or not a decodable signal is detected in the COT.

In operation for controlling sequentially switching between carrier frequencies of the sequence of carrier frequencies the receiver device of the embodiment illustrated in FIG. 12B monitors, at block 1221, for a decodable signal from the transmitter device in a COT of the current carrier frequency. Thereafter, at block 1222 of the illustrated embodiment, the receiver device determines if a decodable signal from the transmitter device was detected in the COT that was monitored. For example, the receiver device may determine if a preamble, CSI-RS, DMRS, DCI, etc. is decodable in the COT.

If a decodable signal is not detected by the receiver device during the COT, processing according to the embodiment illustrated in FIG. 12B proceeds to block 1223 to initiate carrier frequency switching. For example, the receiver device may switch to a next carrier frequency of the sequence of carrier frequencies, whereby the carrier frequency switched to now becomes the current carrier frequency for monitoring of a COT for a decodable signal from the transmitter device. Accordingly, processing according to the embodiment illustrated in FIG. 12B proceeds from block 1223 to block 1221 to again monitor for a decodable signal in a COT of the now current carrier frequency (i.e., the carrier frequency that was switched to by the receiver device).

If, however, a decodable signal was detected by the receiver device during the COT, processing according to the embodiment illustrated in FIG. 12B proceeds to block 1224 for signal reception by the receiver device. For example, the receiver device may remain on the current carrier frequency, without switching to a next carrier frequency of the sequence of carrier frequencies, and may decode the signal transmitted via the carrier frequency and utilize the information decoded therefrom in operation of the receiver device at block 1204 (FIG. 12A).

Referring again to FIG. 12A, at block 1204 of the illustrated embodiment the receiver device decodes and utilizes a signal transmitted by the transmitter device via the current carrier frequency in a COT determined to have a decodable signal detected therein. Processing according to flow 1200 illustrated in FIG. 12A then proceeds to block 1203 to control sequentially switching between carrier frequencies according to the opportunistic frequency switching procedure of the illustrated embodiment.

It should be appreciated that, although example embodiments have been described herein with reference to a base station (e.g., any of base stations 105) comprising a transmitter device and a UE (e.g., any of UEs 115) comprising a receiver device, opportunistic frequency switching implemented according to embodiments of the present disclosure may utilize other devices as the transmitter device and/or receiver device. For example, a UE (e.g., any of UEs 115) may be utilized as a transmitter device and a base station (e.g., any of base stations 105) may be utilized as a receiver device in accordance with some implementations of an opportunistic frequency switching procedure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5, 7, 11A, 11B, 12A, and 12B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination;

A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   dividing, by a base station, a system bandwidth into a plurality of frequency transmission units, wherein the base station operates in a frame-based equipment (FBE) mode;
   configuring, by the base station, a pattern of sensing locations in each frame for each frequency transmission unit of the plurality of frequency transmission units, wherein an inter-unit delay of sensing locations between a first frequency transmission unit of the plurality of frequency transmission units and a next adjacent frequency transmission unit of the plurality of frequency transmission units and between a last frequency transmission unit of the plurality of frequency transmission units and the first frequency transmission unit is a fixed duration; and
   signaling, by the base station, an indication identifying the plurality of frequency transmission units and the pattern of sensing locations to one or more served user equipments (UEs).

2. The method of claim 1, further including:
   detecting, by the base station, interference during a sensing location of a current frequency transmission unit;
   switching, by the base station, to an adjacent frequency transmission unit in response to the interference, wherein the switching occurs within the inter-unit delay; and
   sensing, by the base station, for transmission access to the adjacent frequency transmission unit during a next sensing location of the adjacent frequency transmission unit after the inter-unit delay.

3. The method of claim 1, wherein a frequency transmission unit includes one of:
   a carrier frequency; or
   a bandwidth part (BWP) of the system bandwidth.

4. The method of claim 1, wherein the inter-unit delay includes a duration to accommodate a signal processing time and a tuning time to tune to an adjacent frequency transmission unit for each of the base station and the one or more served UEs.

5. The method of claim 1, wherein a frequency transmission unit of the plurality of frequency transmission units includes a carrier frequency.

6. The method of claim 1, wherein a frequency transmission unit of the plurality of frequency transmission units includes a bandwidth part (BWP) of the system bandwidth.

7. An apparatus for wireless communication, the apparatus comprising:
   at least one processor; and
   a memory coupled to the at least one processor, wherein the at least one processor is configured to:
   divide a system bandwidth into a plurality of frequency transmission units, wherein the apparatus operates in a frame-based equipment (FBE) mode;
   configure a pattern of sensing locations in each frame for each frequency transmission unit of the plurality of frequency transmission units, wherein an inter-unit delay of sensing locations between a first frequency transmission unit of the plurality of frequency transmission units and a next adjacent frequency transmission unit of the plurality of frequency transmission units and between a last frequency transmission unit of the plurality of frequency transmission units and the first frequency transmission unit is a fixed duration; and
   signal an indication identifying the plurality of frequency transmission units and the pattern of sensing locations to one or more served user equipments (UEs).

8. The apparatus of claim 7, wherein the at least one processor is further configured to:
   detect interference during a sensing location of a current frequency transmission unit;
   switch to an adjacent frequency transmission unit in response to the interference, wherein the switching occurs within the inter-unit delay; and
   sense for transmission access to the adjacent frequency transmission unit during a next sensing location of the adjacent frequency transmission unit after the inter-unit delay.

9. The apparatus of claim 7, wherein a frequency transmission unit includes one of:
   a carrier frequency; or
   a bandwidth part (BWP) of the system bandwidth.

10. The apparatus of claim 7, wherein the inter-unit delay includes a duration to accommodate a signal processing time and a tuning time to tune to an adjacent frequency transmission unit for each of the apparatus and the one or more served UEs.

11. The apparatus of claim 7, wherein a frequency transmission unit of the plurality of frequency transmission units includes a carrier frequency.

12. The apparatus of claim 7, wherein a frequency transmission unit of the plurality of frequency transmission units includes a bandwidth part (BWP) of the system bandwidth.

13. A method of wireless communication, comprising:
   dividing, by a base station, a system bandwidth into an anchor frequency transmission unit having a first bandwidth and one or more opportunistic frequency transmission units having each having another bandwidth;
   configuring, by the base station, a pattern of sensing locations in each frame for the anchor frequency transmission unit and the one or more opportunistic frequency transmission units, wherein an inter-unit delay of sensing locations between the anchor frequency transmission unit and a next adjacent frequency transmission unit of the one or more opportunistic frequency transmission units is within a minimum duration; and
   signaling, by the base station, an indication identifying the anchor frequency transmission unit, the one or more opportunistic frequency transmission units, and the pattern of sensing locations to one or more served user equipments (UEs).

14. The method of claim 13, further including:
- detecting, by the base station, interference during a sensing location of the anchor frequency transmission unit;
- switching, by the base station, to an adjacent frequency transmission unit of the one or more opportunistic frequency transmission units in response to the interference, wherein the switching occurs within the inter-unit delay; and
- sensing, by the base station, for transmission access to the adjacent frequency transmission unit during a next sensing location of the adjacent frequency transmission unit after the inter-unit delay.

15. The method of claim 14, further including:
- sensing, by the base station, for transmission access on a next frame, wherein the next frame is one of:
- within the anchor frequency transmission unit; or
- within the adjacent frequency transmission unit.

16. The method of claim 15, further including:
- receiving, by the base station, a measurement report associated with the anchor frequency transmission unit, wherein the sensing starts from the anchor frequency transmission unit in response to the measurement report indicating no interference on the anchor frequency transmission unit.

17. The method of claim 14, further including:
- sensing, by the base station, for transmission access on a next frame, wherein the next frame is within the anchor frequency transmission unit or wherein the next frame is within the adjacent frequency transmission unit.

18. The method of claim 13, further including:
- signaling, by the base station, an identifier to the one or more served UEs, wherein the identifier identifies a frequency transmission unit to begin sensing for transmission access in a next frame.

19. The method of claim 18, wherein the identifier includes one of:
- an order of sensing for each subsequent frame in a channel occupancy time, wherein the order of sensing identifies an order of each frequency transmission unit between the anchor frequency transmission unit and the one or more opportunistic frequency transmission units to use by the one or more served UEs for the sensing of the each subsequent frame; or
- identification of the anchor frequency transmission unit for the sensing of the each subsequent frame.

20. The method of claim 13, wherein the minimum duration includes a duration to accommodate a signal processing time and a tuning time to tune from the anchor frequency transmission unit to a next transmission unit of the one or more opportunistic frequency transmission units for each of the base station and the one or more served UEs.

21. An apparatus for wireless communication, the apparatus comprising:
- at least one processor; and
- a memory coupled to the at least one processor, wherein the at least one processor is configured to:
  - divide a system bandwidth into an anchor frequency transmission unit having a first bandwidth and one or more opportunistic frequency transmission units having each having another bandwidth;
  - configure a pattern of sensing locations in each frame for the anchor frequency transmission unit and the one or more opportunistic frequency transmission units, wherein an inter-unit delay of sensing locations between the anchor frequency transmission unit and a next adjacent frequency transmission unit of the one or more opportunistic frequency transmission units is within a minimum duration; and
  - signal an indication identifying the anchor frequency transmission unit, the one or more opportunistic frequency transmission units, and the pattern of sensing locations to one or more served user equipments (UEs).

22. The apparatus of claim 21, wherein the at least one processor is further configured to:
- detect interference during a sensing location of the anchor frequency transmission unit;
- switch to an adjacent frequency transmission unit of the one or more opportunistic frequency transmission units in response to the interference, wherein the switching occurs within the inter-unit delay; and
- sense for transmission access to the adjacent frequency transmission unit during a next sensing location of the adjacent frequency transmission unit after the inter-unit delay.

23. The apparatus of claim 22, wherein the at least one processor is further configured to:
- sense for transmission access on a next frame, wherein the next frame is one of:
- within the anchor frequency transmission unit; or
- within the adjacent frequency transmission unit.

24. The apparatus of claim 23, wherein the at least one processor is further configured to:
- receive a measurement report associated with the anchor frequency transmission unit, and wherein the sensing starts from the anchor frequency transmission unit in response to the measurement report indicating no interference on the anchor frequency transmission unit.

25. The apparatus of claim 22, wherein the at least one processor is further configured to:
- sense for transmission access on a next frame, wherein the next frame is within the anchor frequency transmission unit or wherein the next frame is within the adjacent frequency transmission unit.

26. The apparatus of claim 21, wherein the at least one processor is further configured to:
- signal an identifier to the one or more served UEs, wherein the identifier identifies a frequency transmission unit to begin sensing for transmission access in a next frame.

27. The apparatus of claim 26, wherein the identifier includes one of:
- an order of sensing for each subsequent frame in a channel occupancy time, wherein the order of sensing identifies an order of each frequency transmission unit between the anchor frequency transmission unit and the one or more opportunistic frequency transmission units to use by the one or more served UEs for the sensing of the each subsequent frame; or
- identification of the anchor frequency transmission unit for the sensing of the each subsequent frame.

28. The apparatus of claim 21, wherein the minimum duration includes a duration to accommodate a signal processing time and a tuning time to tune from the anchor frequency transmission unit to a next transmission unit of the one or more opportunistic frequency transmission units for each of the apparatus and the one or more served UEs.

* * * * *